United States Patent
Huang

(10) Patent No.: US 8,599,498 B2
(45) Date of Patent: Dec. 3, 2013

(54) OPTICAL LENS ASSEMBLY FOR IMAGE TAKING

(75) Inventor: Hsin-Hsuan Huang, Taichung (TW)

(73) Assignee: Largan Precision Co., Taichung (TW)

( * ) Notice: Subject to any disclaimer, the term of this patent is extended or adjusted under 35 U.S.C. 154(b) by 188 days.

(21) Appl. No.: 13/231,196

(22) Filed: Sep. 13, 2011

(65) Prior Publication Data
US 2012/0257287 A1    Oct. 11, 2012

(30) Foreign Application Priority Data
Apr. 8, 2011   (TW) .............................. 100112244 A

(51) Int. Cl.
  *G02B 9/60*  (2006.01)
  *G02B 13/18*  (2006.01)
(52) U.S. Cl.
  CPC .................................. *G02B 9/60* (2013.01)
  USPC .......................................... 359/764; 359/714
(58) Field of Classification Search
  USPC ......................................... 359/714, 753, 764
  See application file for complete search history.

(56) References Cited

U.S. PATENT DOCUMENTS

| 7,826,151 B2 | 11/2010 | Tsai |
| 2003/0117722 A1 | 6/2003 | Chen |
| 2004/0196571 A1 | 10/2004 | Shinohara |
| 2010/0253829 A1 | 10/2010 | Shinohara |
| 2010/0254029 A1 | 10/2010 | Shinohara |
| 2012/0229917 A1* | 9/2012 | Huang .......................... 359/713 |

* cited by examiner

*Primary Examiner* — William Choi
(74) *Attorney, Agent, or Firm* — Wang Law Firm, Inc.; Li K. Wang; Stephen Hsu

(57) ABSTRACT

An optical lens assembly for image taking, sequentially arranged from an object side to an image side, comprising: the first lens element with positive refractive power having a convex object-side surface; the second lens element with negative refractive power having a convex object-side surfaces and a concave image-side surface; the third lens element with positive refractive power having a convex image-side surface; the fourth lens element with refractive power having two aspheric optical surfaces; the fifth lens element with refractive power having a concave object-side surface and both aspheric optical surfaces; an image sensor disposed on an image plane and a stop provided for imaging a photographed object; specific relations being satisfied. Thereby, the optical lens assembly for image taking has good aberration correction, and can shorten the total length for use in compact cameras and mobile phones requiring high resolution.

20 Claims, 14 Drawing Sheets

OPTICAL LENS ASSEMBLY FOR IMAGE TAKING

BACKGROUND OF THE INVENTION

1. Field of the Invention

The present invention relates to an optical lens assembly for image taking, and more particularly to an optical lens assembly for image taking comprised of five lens elements to achieve the purpose of high resolution for applying to electronic products.

2. Description of the Related Art

In compact electronic products such as digital still cameras or mobile phone cameras, an optical lens assembly for image taking is generally installed for capturing images, and the optical lens assembly tends to be developed with a compact design and a low cost, while meeting the user requirements of good aberration correction, high resolution, and high image quality.

In general, a conventional optical lens assembly of a mini electronic product comes with different designs, including the two-lens, three-lens, four-lens, and five-or-more lens designs. However, if the image quality is taken into consideration, the optical lens assembly for image taking with the four-lens and five-lens designs have advantages on aberration correction and modulation transfer function (MTF) performance, wherein the five-lens design has a higher resolution than the four-lens design, thus being applicable for electronic products requiring high quality and high pixels.

In various compact optical lens assemblies for image taking with the five-lens design and a constant focal length, the prior art adopts different combinations of positive and negative refractive powers or a cemented doublet lens to shorten the total length of the optical system, or uses the fourth lens element and the fifth lens element with different refractive powers to build the optical system as disclosed in U.S. Pat. Publication Nos. 2004/0196571 and 2003/0117722, adopting a cemented single lens to shorten the total length of the optical system. However, the total length of the aforementioned conventional optical system is usually too long to suit compact electronic devices use.

In products such as compact digital cameras, webcams and mobile phone cameras, an optical lens assembly requires a compact design, a short focal length, and a good aberration correction. Among various designs of the optical lens assemblies for image taking with the five-lens design and a constant focal length, the fourth lens element or the fifth lens element having an inflection point is provided as disclosed in U.S. patents and publications including U.S. Pat. No. 7,826,151, 2010/0254029, and 2010/0253829, adopting the fourth lens element and the fifth lens element having an inflection point to tends towards the design with the shorter total length. In these prior arts, the fifth lens element with the inflection point is used for correcting the aberration or distortion of images, but the change of curvature of the fifth lens element is too large to be conducive to manufacture. In addition, these prior arts adopt the fourth lens element with stronger refractive power to shorten the total length of the optical lens assembly for image taking, such that the aberration produced by the fifth lens element cannot be corrected easily to meet the requirement. Therefore, the present invention provides a feasible design, adopts a combination of refractive powers, convex and concave surfaces of the five lens elements, and enables the fourth lens element and the fifth lens element to be with equal negative refractive powers, or applies the fourth lens element with weaker positive refractive power to achieve the effects of providing a high image quality and applying the optical lens assembly to compact electronic products that require high resolution.

SUMMARY OF THE INVENTION

Therefore, it is a primary objective of the present invention to provide an optical lens assembly for image taking, sequentially arranged from an object side to an image side, comprising the first lens element, the second lens element, the third lens element, the fourth lens element, and the fifth lens element; wherein, the first lens element with positive refractive power has a convex object-side surface; the second lens element with negative refractive power has a convex object-side surface and a concave image-side surface; the third lens element with positive refractive power has a convex image-side surface; the fourth lens element with refractive power has both object-side surface and image-side surface being aspheric; the fifth lens element with refractive power has a concave object-side surface, and both object-side surface and image-side surface are aspheric, and the optical lens assembly for image taking satisfies the following relations:

$$0.7 < f/f_1 < 2.5; \quad (1)$$

$$-2.5 < f/f_2 < -0.7; \quad (2)$$

$$0.8 < f/f_3 < 2.5; \quad (3)$$

$$0.1 < (R_5 + R_6)/(R_5 - R_6) < 1.5; \quad (4)$$

wherein, f is a focal length of the optical lens assembly for image taking, $f_1$ is a focal length of the first lens element, $f_2$ is a focal length of the second lens element, $f_3$ is a focal length of the third lens element, $R_5$ is a curvature radius of the object-side surface of the third lens element, and $R_6$ is a curvature radius of the image-side surface of the third lens element.

On the other hand, the present invention provides an optical lens assembly for image taking as described above, further comprising a stop, wherein the fifth lens element with negative refractive power has a convex image-side surface, and the optical lens assembly for image taking further satisfies one or more of the following relations in addition to the relations of (1), (2), (3) and (4):

$$0.05 < (R_3 - R_4)/(R_3 + R_4) < 0.8; \quad (5)$$

$$-0.7 < f/f_4 < 0.5; \quad (6)$$

$$0.5 < S_d/T_d < 0.8; \quad (7)$$

$$-0.2 < R_1/R_2 < 0.2; \quad (8)$$

$$0.3 < T_{34}/T_{45} < 1.3; \quad (9)$$

additionally, $1.3 < f/f_3 < 1.9;$ (10)

$$-0.7 < R_9/f < -0.3; \quad (11)$$

wherein, $R_1$ is a curvature radius of the object-side surface of the first lens element, $R_2$ is a curvature radius of the image-side surface of the first lens element, $R_3$ is a curvature radius of the object-side surface of the second lens element, $R_4$ is a curvature radius of the image-side surface of the second lens element, $R_9$ is a curvature radius of the object-side surface of the fifth lens element, f is the focal length of the optical lens assembly for image taking, $f_3$ is the focal length of the third lens element, $f_4$ is a focal length of the fourth lens element, $T_{34}$ is an axial distance between the third lens element and the fourth lens element, $T_{45}$ is an axial distance between the fourth lens element and the fifth lens element, $T_d$ is an axial distance from the object-side surface of the first lens element to the image-side surface of the fifth lens element, and $S_d$ is an axial distance from the stop to the image-side surface of the fifth lens element.

Moreover, the present invention provides an optical lens assembly for image taking, further comprising an image plane, and sequentially arranged from an object side to an image side, comprising: the first lens element, the second lens element, the third lens element, the fourth lens element and the fifth lens element, wherein the first lens element with positive refractive power has a convex object-side surface; the second lens element with negative refractive power has a convex object-side surface and a concave image-side surface; the third lens element with positive refractive power has a convex image-side surface; the fourth lens element with refractive power has a convex object-side surface and a concave image-side surface, and both object-side surface and image-side surface are aspheric; the fifth lens element with negative refractive power has a concave object-side surface and a convex image-side surface, and both object-side surface and image-side surface are aspheric; and the optical lens assembly for image taking further satisfies one or more of the following relations in addition to the relations of (1), (2), (3), (4) and (5):

$$-0.4<R_1/R_2<0.4; \tag{12}$$

$$25<v_1-v_2<42; \tag{13}$$

$$\text{additionally, } 0.2<(R_3-R_4)/(R_3+R_4)<0.5; \tag{14}$$

$$25<v_3-v_4<42; \tag{15}$$

$$-0.4<f/f_4<0.2; \tag{16}$$

$$0.13<BFL/TTL<0.25; \tag{17}$$

wherein, $R_1$ is the curvature radius of the object-side surface of the first lens element, $R_2$ is the curvature radius of the image-side surface of the first lens element, $R_3$ is the curvature radius of the object-side surface of the second lens element, $R_4$ is the curvature radius of the image-side surface of the second lens element, f is the focal length of the optical lens assembly for image taking, $f_4$ is the focal length of the fourth lens element, $v_1$ is an Abbe number of the first lens element, $v_2$ is an Abbe number of the second lens element, $v_3$ is an Abbe number of the third lens element, $v_4$ is an Abbe number of the fourth lens element, BFL is an axial distance from the image-side surface of the fifth lens element to the image plane, TTL is an axial distance from the object-side surface of the first lens element to the image plane.

Another objective of the present invention is to provide an optical lens assembly for image taking, sequentially arranged from an object side to an image side along an optical axis, comprising: the first lens element, the second lens element, the third lens element, the fourth lens element, and the fifth lens element, wherein the first lens element with positive refractive power has a convex object-side surface; the second lens element with negative refractive power has a convex object-side surface and a concave image-side surface; the third lens element with refractive power has a convex image-side surface; the fourth lens element with refractive power has both object-side surface and image-side surface being aspheric; the fifth lens element with refractive power has a concave object-side surface and a convex image-side surface, and both object-side surface and image-side surface are aspheric; and the optical lens assembly for image taking satisfies the following relations:

$$0.7<f/f_1<2.5; \tag{1}$$

$$-0.7<f/f_4<0.5; \tag{6}$$

wherein, f is a focal length of the optical lens assembly for image taking, $f_1$ is a focal length of the first lens element, and $f_4$ is a focal length of the fourth lens element.

On the other hand, the present invention provides an optical lens assembly for image taking as described above, and further satisfies one or more of the following relations in addition to the relations of (1) and (6):

$$-0.4<R_1/R_2<0.4; \tag{12}$$

$$0.1<(R_5+R_6)/(R_5-R_6)<1.5; \tag{4}$$

$$-0.7<R_9/f<-0.3; \tag{11}$$

wherein, $R_1$ is a curvature radius of the object-side surface of the first lens element, $R_2$ is a curvature radius of the image-side surface of the first lens element, $R_5$ is a curvature radius of the object-side surface of the third lens element, $R_6$ is a curvature radius of the image-side surface of the third lens element, $R_9$ is a curvature radius of the object-side surface of the fifth lens element, and f is the focal length of the optical lens assembly for image taking.

Moreover, the present invention provides an optical lens assembly for image taking as described above, further comprising a stop, wherein the third lens element has positive refractive power; the fourth lens element has a convex object-side surface and a concave image-side surface; the fifth lens element has negative refractive power; and the optical lens assembly for image taking, further satisfies one or more of the following relations in addition to the relations of (1), (6) and (12):

$$-2.5<f/f_2<-0.7; \tag{2}$$

$$0.5<S_d/T_d<0.8; \tag{7}$$

$$0.2<(R_3-R_4)/(R_3+R_4)<0.5; \tag{14}$$

$$1.3<f/f_3<1.9; \tag{10}$$

wherein, $R_3$ is a curvature radius of the object-side surface of the second lens element, $R_4$ is a curvature radius of the image-side surface of the second lens element, f is the focal length of the optical lens assembly for image taking, $f_2$ is a focal length of the second lens element, $f_3$ is a focal length of the third lens element, $T_d$ is an axial distance from the object-side surface of the first lens element to the image-side surface of the fifth lens element, and $S_d$ is an axial distance from the aperture stop to the image-side surface of the fifth lens element.

In the present invention, the first lens element, second lens element, third lens element, fourth lens element and fifth lens element are installed with an appropriate interval apart on the optical axis to achieve a good aberration correction and a more advantageous modulation transfer function (MTF) in the condition of a larger field angle.

In the optical lens assembly for image taking of the present invention, the first lens element with positive refractive power provides the portion of refractive power required by the combination of the first lens element and the second lens element to facilitate shortening the total length of the first lens element and the second lens element; the fifth lens element with negative refractive power can correct the aberration resulted from the lens with positive refractive power and amend the Petzval sum of the optical lens assembly effectively to make the edge image surface flatter, while facilitating the aberration correction of the system; the third lens element with positive refractive power can correct the aberration produced by the first lens element and the second lens element effectively, such that the overall aberration and distortion of the optical lens assembly for image capture can meet the high resolution requirement.

In the optical lens assembly for image taking of the present invention, a stop can be added, and the stop between the second lens element and the third lens element prevents the larger distortion of visual field image occurred at the edges of the first lens element and the second lens element to enhance the image quality.

In the optical lens assembly for image taking of the present invention, the fourth lens element with positive refractive power and the fifth lens element with negative refractive power are adopted to reduce the focal length, such that total length of the optical lens assembly for image taking of the present invention can be shorter. If the fourth lens element with negative refractive power and the fifth lens element with negative refractive power are adopted, the aberration correction function can be enhanced.

DETAILED DESCRIPTION OF THE PREFERRED EMBODIMENTS

Figure 1A:
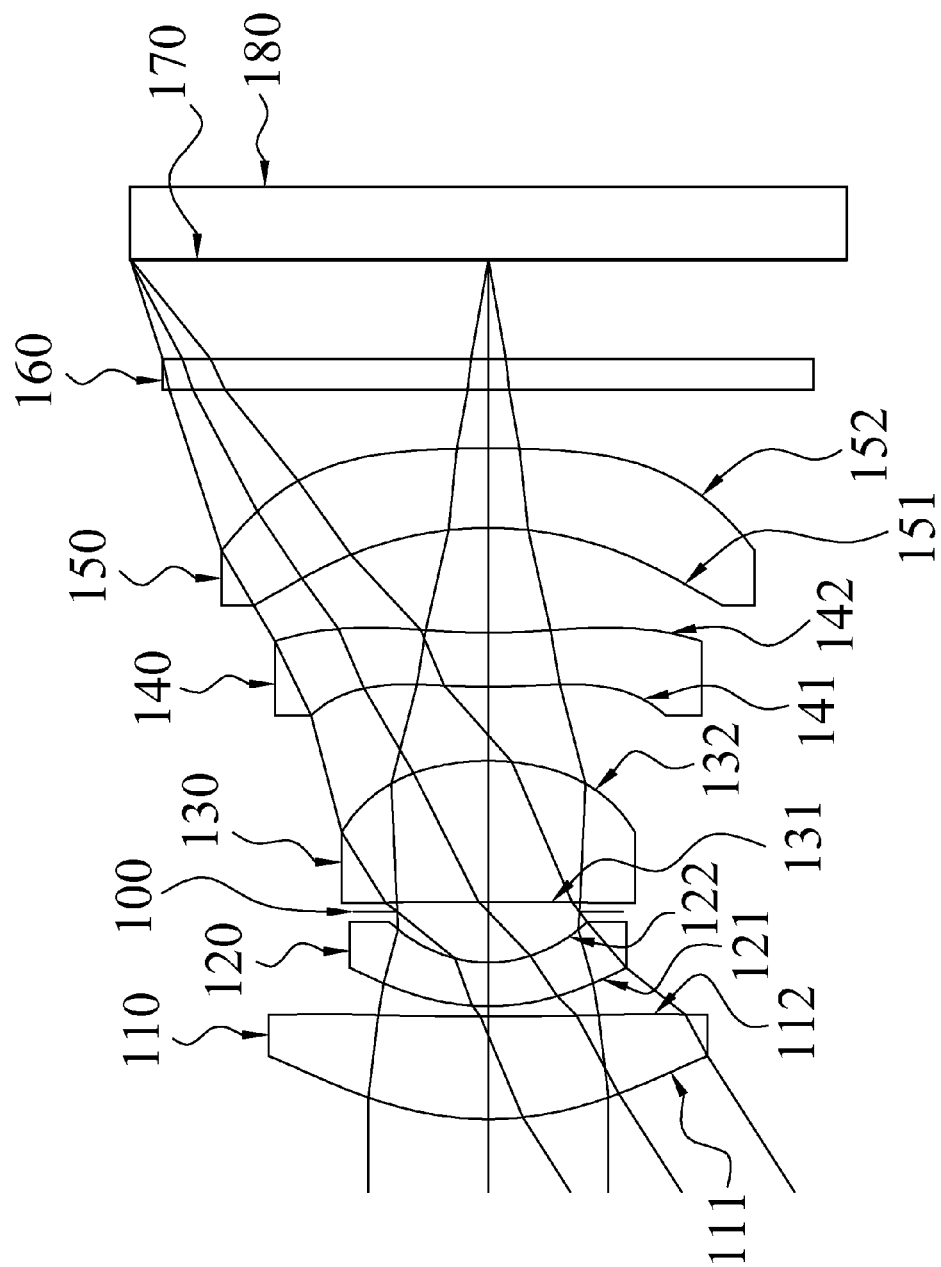
FIG. 1A is a schematic view of an optical lens assembly for image taking in accordance with the first preferred embodiment of the present invention.

With reference to FIG. 1A, an optical lens assembly for image taking of the present invention sequentially arranged from an object side to an image side along an optical axis comprises: the first lens element (110), the second lens element (120), the third lens element (130), the fourth lens element (140) and the fifth lens element (150), wherein the first lens element (110) with positive refractive power has a convex object-side surface (111); the second lens element (120) with negative refractive power has a convex object-side surface (121) and a concave image-side surface (122); the third lens element (130) with positive refractive power has a convex image-side surface (132); the fourth lens element (140) with refractive power has both object-side surface (141) and image-side surface (142) being aspheric; and the fifth lens element (150) with refractive power has a concave object-side surface (151), and both object-side surface (151) and image-side surface (152) are aspheric. The optical lens assembly for image taking further comprises a stop, which can be an aperture stop (100) and an IR-filter (160), and the aperture stop (100) can be a middle aperture stop installed between the second lens element (120) and the third lens element (130), and the IR-filter (160) is disposed between the fifth lens element (150) and the image plane (170) and generally made of plate optical material provided for adjusting the wavelength range of the light for image of the present invention. The optical lens assembly for image taking further could comprise an image sensor (180) at the image plane (170) for imaging a photographed object. The first lens element (110), the second lens element (120), the third lens element (130), the fourth lens element (140) and the fifth lens element (150) come with aspheric optical surfaces in compliance with the aspherical surface formula as given in Equation (18).

$$X(Y) = \frac{(Y^2/R)}{1+\sqrt{(1-(1+K)(Y/R)^2)}} + \sum_i (A_i)\cdot(Y^i) \quad (18)$$

Wherein, X is the relative height from a point on the aspherical surface with a distance Y from the optical axis to a tangent plane at the tip of the optical axis of the aspherical surface;

Y is the distance between a point on the curve of the aspherical surface and the optical axis;

K is the conic coefficient; and $A_i$ is the $i^{th}$ level aspherical surface coefficient.

In the optical lens assembly for image taking of the present invention, the first lens element (110), the second lens element (120), the third lens element (130), the fourth lens element (140) and the fifth lens element (150) can be made of glass or plastic, and the optical surfaces can be spheric or aspheric surfaces. If aspheric optical surfaces are adopted, then the curvature radius of the optical surface can be used for changing the refractive power to reduce or eliminate aberrations, so as to decrease the number of lens elements used in the optical lens assembly for image capture and shorten the total length of the optical lens assembly for image taking effectively. Therefore, the optical lens assembly for image taking of the present invention satisfies the relations (1), (2), (3) and (4) by arrangements of the first lens element (110), second lens element (120), third lens element (130), fourth lens element (140) and fifth lens element (150).

If the relations (1), (2) and (3) are satisfied, which means that an appropriate allocation of refractive powers among the focal length f of the optical lens assembly for image taking, the focal length $f_1$ of the first lens element (110), the focal length $f_2$ of the second lens element (120), the focal length $f_3$ of the third lens element (130) can be achieved, such that the ratios of the focal length f of the optical lens assembly for image taking to the focal length $f_1$ of the first lens element (110), the focal length $f_2$ of the second lens element (120), and the focal length $f_3$ of the third lens element (130) falls between 0.7 to 2.5, the sensitivity of the optical lens assembly for image taking can be controlled and high-level aberrations can be further corrected. In addition, if the curvature of the third lens element (130) satisfies the relation (4), the change of surface shape of the third lens element (130) will be limited to not be too large, so as to facilitate the correction of the system aberration.

In the optical lens assembly for image taking of the present invention as well, if the ratio of the curvature radius $R_1$ of the object-side surface (111) of the first lens element (110) to the curvature radius $R_2$ of the image-side surface (112) of the first lens element (110) is limited to the relation (8) or (12), an appropriate change of the curvature can provide the required positive refractive power to the system to facilitate reducing the total length of the optical lens assembly, while correcting the astigmatic aberration of system effectively. If the relation (11) is too large, while the fifth lens element (150) has a concave object-side surface (151), then the negative refractive power is relative weaker, so as to reduce the aberration correction capability. If the relation (11) is too small, then the negative refractive power will be relatively stronger, so that the total length cannot be reduced effectively due to the increased focal length. Therefore, when the relation (11) is controlled within an appropriate range, the aberration can be corrected and the total length can be reduced effectively. If the relation (13) or (15) is satisfied, the difference between Abbe number $v_1$ of the first lens element (110) and the Abbe number $v_2$ of the second lens element (120) will not be too small, so that the chromatic aberration produced by the first lens element (110) and the second lens element (120) can be corrected effectively, and the chromatic aberration correction capability of the second lens element (120) can be enhanced. Similarly, if the relation (15) is satisfied, and appropriate Abbe numbers of the third lens element (130) and the fourth lens element (140) are assigned, then the chromatic aberration of the optical lens assembly for image taking can be corrected effectively.

If the curvature radius $R_3$ of the object-side surface (121) of the second lens element (120) and the curvature radius $R_4$ of the image-side surface (122) of the second lens element (120) are limited to the relations (5) and (14), the curvature of both optical surfaces of the second lens element (120) can be assigned to improve the aberration compensation capability and limit the change of a surface shape of the second lens element (120) to facilitate the manufacture. Similarly, if the relations (9) and (7) are satisfied, the total length of the optical lens assembly for image taking can be shortened. If the relation (17) is satisfied, then the back focal length can be reduced to shorten the length of the optical lens assembly for image taking.

The optical lens assembly for image taking of the present invention is described by preferred embodiments and related drawings in details as follows.

First Preferred Embodiment

Figure 1B:
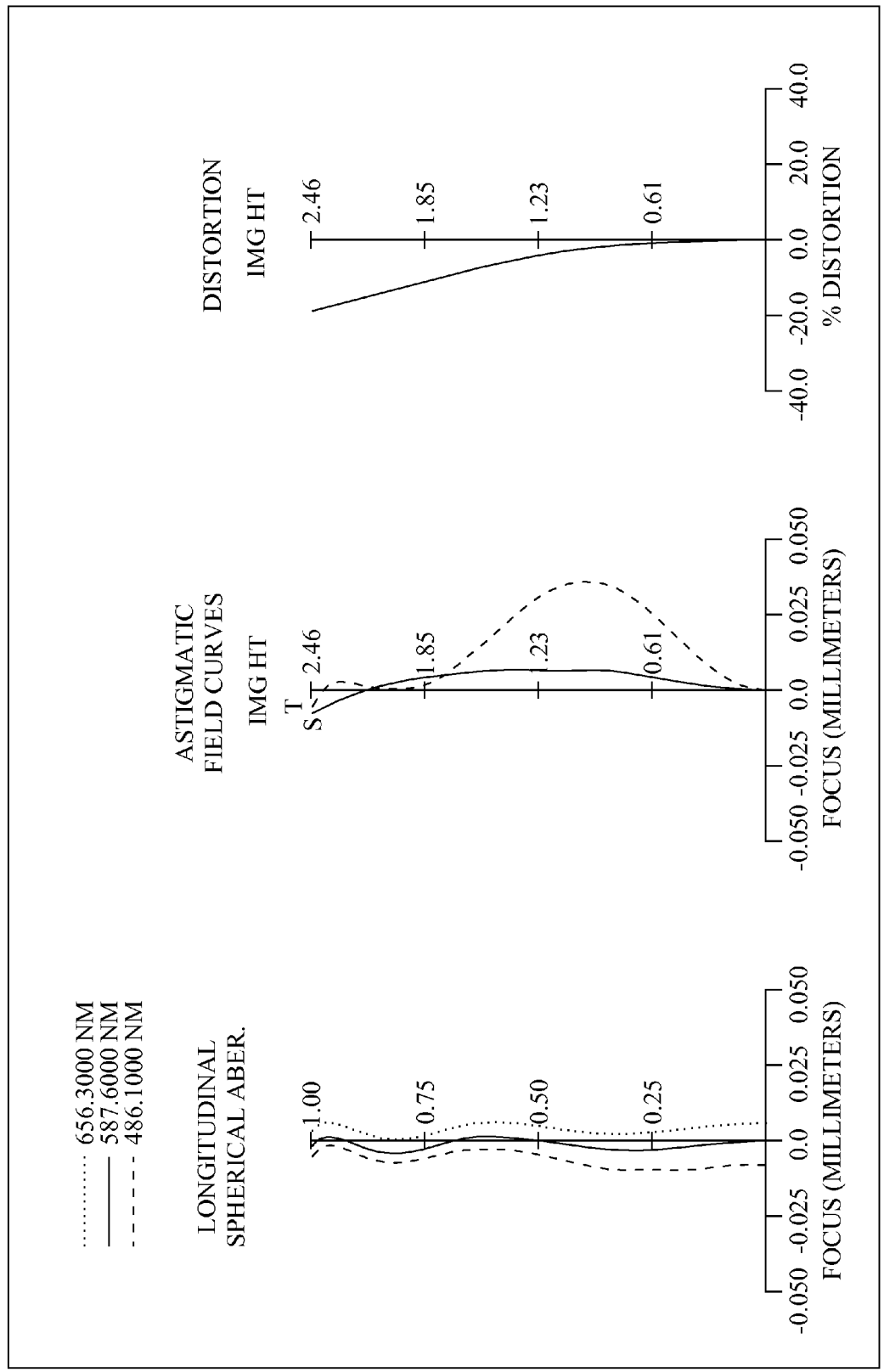
FIG. 1B is a series of aberration curves of the first preferred embodiment of the present invention.

With reference to FIGS. 1A and 1B for a schematic view of an optical lens assembly for image taking and a series of aberration curves in accordance with the first preferred embodiment of the present invention respectively, the optical lens assembly for image taking primarily comprises five lens elements, a stop and an IR-filter (160). More specifically, the stop can be an aperture stop (100), and the optical lens assembly for image taking; sequentially arranged from an object side to an image side along an optical axis, comprises: a plastic first lens element (110) with positive refractive power, having a convex object-side surface (111) and a concave image-side surface (112), and both object-side surface (111) and image-side surface (112) thereof being aspheric; a plastic second lens element (120) with negative refractive power, having a convex object-side surface (121) and a concave image-side surface (122), and both object-side surface (121) and image-side surface (122) thereof being aspheric; the aperture stop (100); a plastic third lens element (130) with positive refractive power, having a convex object-side surface (131) and a convex image-side surface (132), and both object-side surface (131) and image-side surface (132) thereof being aspheric; a plastic fourth lens element (140) with positive refractive power, having a convex object-side surface (141) and a concave image-side surface (142), and both object-side surface (141) and image-side surface (142) thereof being aspheric; a plastic fifth lens element (150) with negative refractive power, having a concave object-side surface (151) and a convex image-side surface (152), and both object-side surface (151) and image-side surface (152) thereof being aspheric; the IR-filter (160), made of glass, without affecting the focal length of the optical lens assembly for image taking; an image sensor (180) at the image plane (170). With the combination of the five lens elements, the aperture stop (100) and the IR-filter (160), an image of the photographed object can be formed and projected onto the image sensor (180).

TABLE 1

Optical data of this preferred embodiment
f = 4.78 mm, Fno = 2.90, HFOV = 32.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.203828(ASP) | 0.706 | Plastic | 1.535 | 56.3 | 4.40 |
| 2 | | 31.331598(ASP) | 0.070 | | | | |
| 3 | Lens 2 | 1.575561(ASP) | 0.300 | Plastic | 1.633 | 23.4 | −3.90 |
| 4 | | 0.890856(ASP) | 0.348 | | | | |
| 5 | Ape. Stop | Plano | 0.070 | | | | |
| 6 | Lens 3 | 66.628969(ASP) | 0.968 | Plastic | 1.535 | 56.3 | 3.27 |
| 7 | | −1.786499(ASP) | 0.509 | | | | |
| 8 | Lens 4 | 4.388489(ASP) | 0.370 | Plastic | 1.633 | 23.4 | 992.35 |
| 9 | | 4.274937(ASP) | 0.721 | | | | |
| 10 | Lens 5 | −2.513132(ASP) | 0.547 | Plastic | 1.535 | 56.3 | −6.22 |
| 11 | | −11.066002(ASP) | 0.405 | | | | |

TABLE 1-continued

Optical data of this preferred embodiment
f = 4.78 mm, Fno = 2.90, HFOV = 32.5 deg.

| Surface # | | Curvature Radius | Thickness | Material | Index | Abbe # | Focal Length |
|---|---|---|---|---|---|---|---|
| 12 | IR-filter | Plano | 0.210 | Glass | 1.517 | 64.2 | — |
| 13 | | Plano | 0.681 | | | | |
| 14 | Image | Plano | — | | | | |

Note:
Reference wavelength is 587.6 nm.
ASP stands for aspherical surfaces.

The optical data of this preferred embodiment are listed in Table 1, wherein the object-side surfaces and the image-side surfaces of the first lens element (110) to the fifth lens element (150) comply with the aspherical surface formula as given in Equation (18), and their aspheric coefficients are listed in Table 2 as follows:

TABLE 2

Aspheric coefficients of this preferred embodiment

| | Surface # | | | | |
|---|---|---|---|---|---|
| | 1 | 2 | 3 | 4 | 6 |
| k = | −6.81086E−01 | −3.16681E+01 | −1.87112E−01 | −2.19571E−02 | 1.20000E+02 |
| A4 = | −1.01218E−02 | −5.50419E−04 | −7.24541E−02 | −1.55045E−01 | −1.91673E−02 |
| A6 = | −7.13779E−03 | 5.83197E−03 | 6.33101E−02 | 2.16154E−02 | −2.39311E−01 |
| A8 = | 1.86517E−03 | −7.80844E−03 | −4.78058E−02 | 7.19784E−02 | 9.41683E−01 |
| A10 = | 2.53710E−04 | 2.12627E−03 | 6.31701E−03 | −1.32792E−01 | −1.92252E+00 |
| A12 = | −2.32282E−04 | −2.13953E−04 | −1.32038E−02 | 8.10358E−02 | 1.53268E+00 |

| | Surface # | | | | |
|---|---|---|---|---|---|
| | 7 | 8 | 9 | 10 | 11 |
| k = | −1.07655E+00 | −5.73216E+01 | 2.81429E+00 | 6.50563E−02 | 1.36806E+01 |
| A4 = | −1.57140E−01 | −1.15887E−01 | −1.01651E−01 | 3.70497E−03 | −5.10187E−02 |
| A6 = | −2.17454E−02 | −6.73354E−02 | −3.10697E−02 | −9.84450E−03 | 2.87925E−03 |
| A8 = | 7.66613E−02 | 7.92935E−02 | 7.12996E−02 | 7.54775E−03 | −1.13492E−03 |
| A10 = | −1.28179E−01 | −1.92935E−02 | −4.41509E−02 | −1.44987E−03 | 2.36065E−04 |
| A12 = | 2.89633E−02 | −1.69411E−02 | 1.24805E−02 | 9.00981E−05 | −3.62441E−05 |
| A14 = | | 7.05214E−03 | −1.39444E−03 | 1.95454E−05 | −9.46202E−06 |
| A16 = | | | | −6.40712E−06 | 4.49099E−06 |

With reference to Table 1 and FIG. 1B for the optical lens assembly for image taking of this preferred embodiment, the focal length of the optical lens assembly for image taking is f=4.78 (mm), the overall aperture value (f-number) of the optical lens assembly for image taking is Fno=2.90, the half of maximum field view angle is HFOV=32.5°. After the optical data of this preferred embodiment are calculated and derived, the optical lens assembly satisfies related relations as shown in Table 3 below, and the related symbols have been described above and thus will not be described again.

TABLE 3

Data of related relations of this preferred embodiment

| Relation | Data | Relation | Data |
|---|---|---|---|
| $v_1 - v_2$ | 32.9 | $f/f_1$ | 1.09 |
| $v_3 - v_4$ | 32.9 | $f/f_2$ | −1.22 |
| $T_{34}/T_{45}$ | 0.7 | $f/f_3$ | 1.46 |
| $R_1/R_2$ | 0.07 | $f/f_4$ | 0.01 |
| $R_9/f$ | −0.53 | BFL/TTL | 0.21 |

TABLE 3-continued

Data of related relations of this preferred embodiment

| Relation | Data | Relation | Data |
|---|---|---|---|
| $(R_3 - R_4)/(R_3 + R_4)$ | 0.28 | $S_d/T_d$ | 0.69 |
| $(R_5 + R_6)/(R_5 - R_6)$ | 0.95 | | |

According to the optical data as shown in Table 1 and the series of aberration curves as shown in FIG. 1B, the optical lens assembly for image taking in accordance with this preferred embodiment of the present invention provides good correction results in aspects of the longitudinal spherical aberration, astigmatic field curving, and distortion.

Second Preferred Embodiment

Figure 2A:
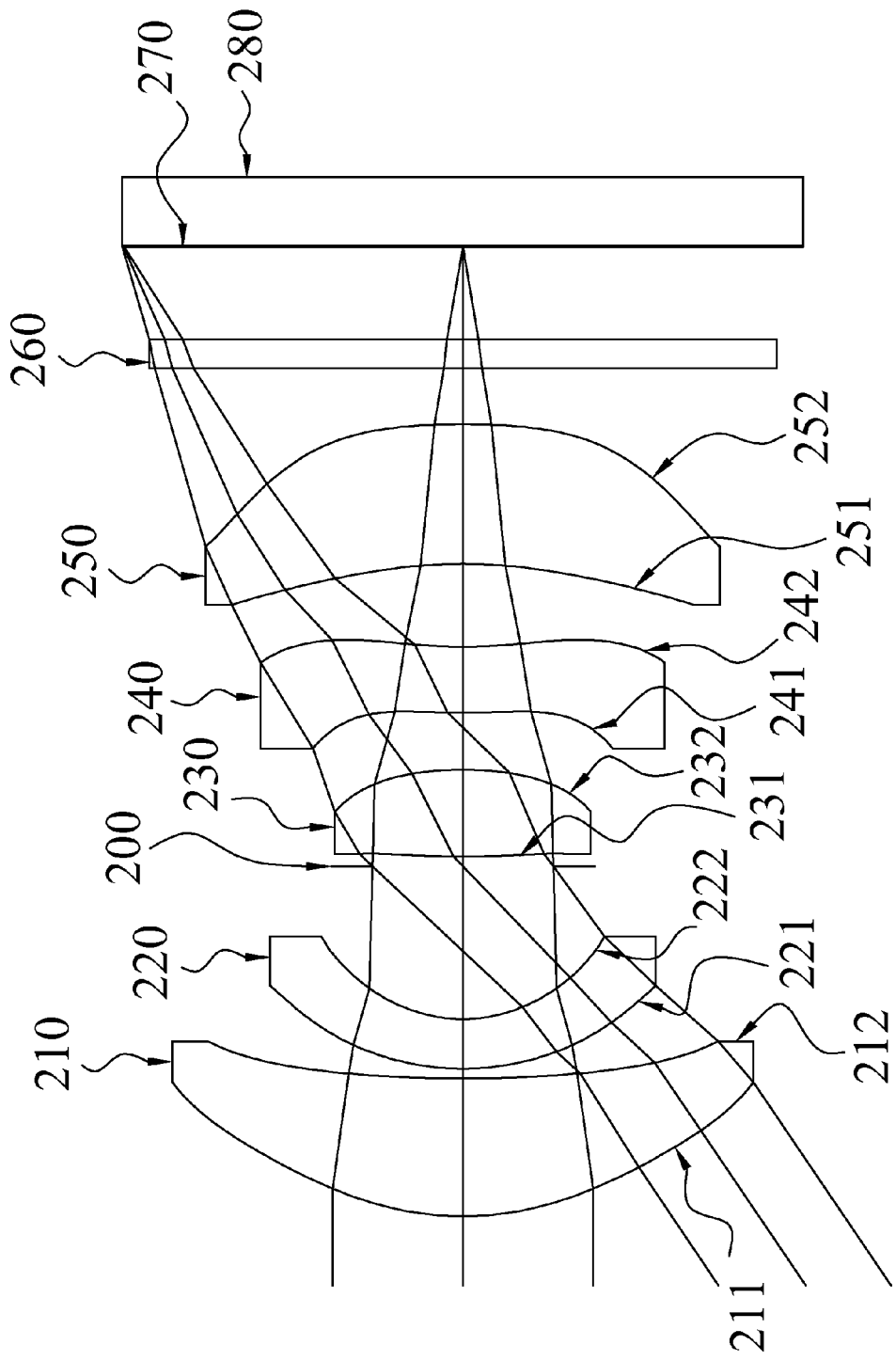
FIG. 2A is a schematic view of an optical lens assembly for image taking in accordance with the second preferred embodiment of the present invention.
Figure 2B:
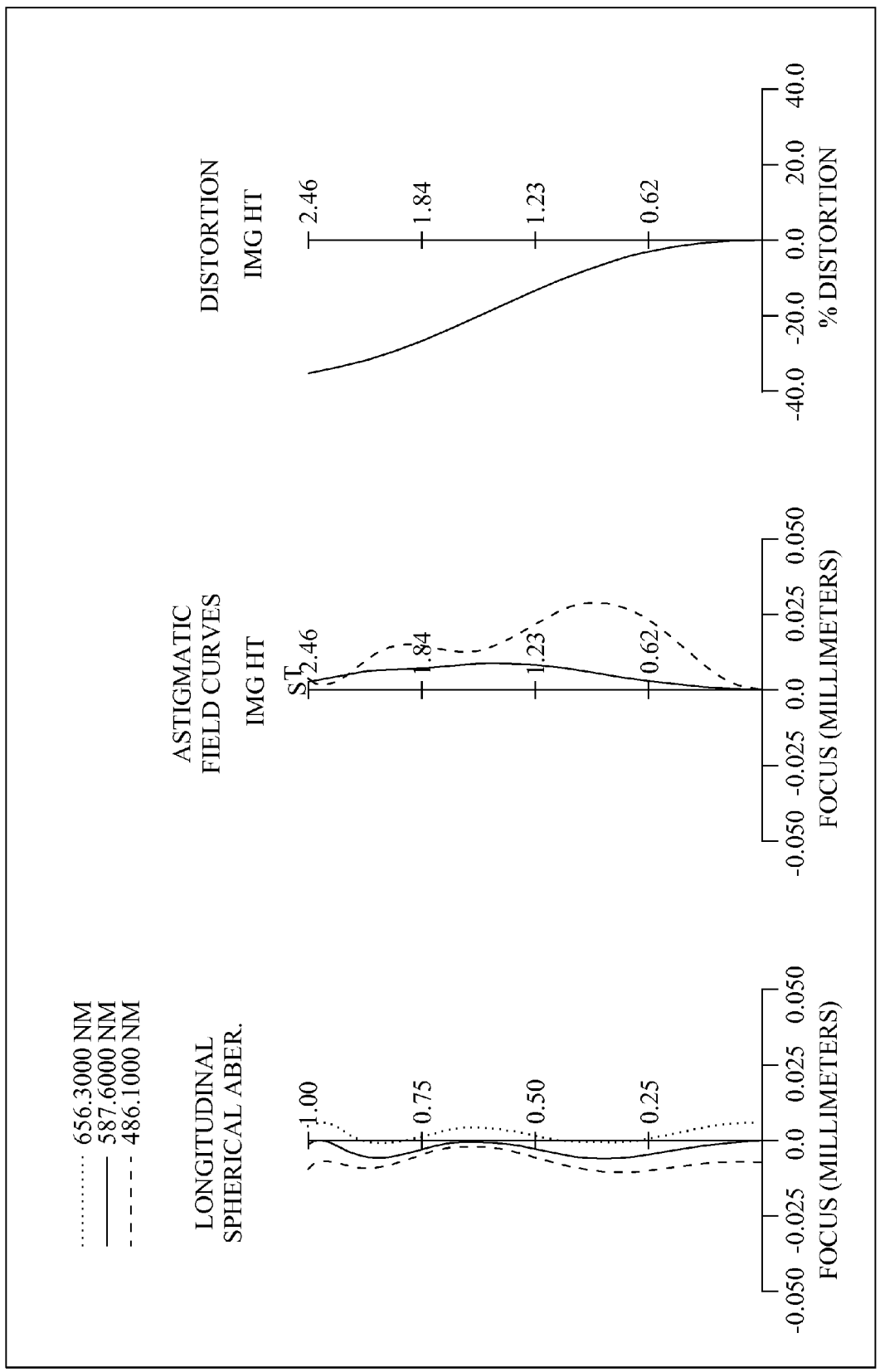
FIG. 2B is a series of aberration curves of the second preferred embodiment of the present invention.

With reference to FIGS. 2A and 2B for a schematic view of an optical lens assembly for image taking and a series of aberration curves in accordance with the second preferred embodiment of the present invention respectively, the optical lens assembly for image taking comprises five lens elements, a stop and an IR-filter (260). More specifically, the stop can be an aperture stop (200), and the optical lens assembly for image taking, sequentially arranged from an object side to an image side along an optical axis, comprises: a plastic first lens element (210) with positive refractive power, having a convex object-side surface (211) and a concave image-side surface (212), and both object-side surface (211) and image-side surface (212) thereof being aspheric; a plastic second lens element (220) with negative refractive power, having a convex object-side surface (221) and a concave image-side surface (222), and both object-side surface (221) and image-side surface (222) thereof being aspheric; the aperture stop (200); a plastic third lens element (230) with positive refractive power, having a convex object-side surface (231) and a convex image-side surface (232), and both object-side surface (231) and image-side surface (232) thereof being aspheric; a plastic fourth lens element (240) with negative refractive power, having a convex object-side surface (241) and a concave image-side surface (242), and both object-side surface (241) and image-side surface (242) thereof being aspheric; a plastic fifth lens element (250) with negative refractive power, having a concave object-side surface (251) and a convex image-side surface (252), and both object-side surface (251) and image-side surface (252) thereof being aspheric; the IR-filter (260), made of glass, being a plate glass provided for adjusting the wavelength range of the light for imaging; an image sensor (280) at the image plane (270). With the combination of the five lens elements, the aperture stop (200) and the IR-filter (260), an image of the photographed object can be formed and projected onto the image sensor (280).

TABLE 4

Optical data of this preferred embodiment
f = 5.66 mm, Fno = 3.00, HFOV = 34.0 deg.

| Surface # |         | Curvature Radius | Thickness | Material | Index | Abbe # | Focal Length |
|---|---|---|---|---|---|---|---|
| 0 | Object | Plano | Infinity | | | | |
| 1 | Lens 1 | 2.213945(ASP) | 0.999 | Plastic | 1.530 | 55.8 | 5.10 |
| 2 | | 10.347306(ASP) | 0.070 | | | | |
| 3 | Lens 2 | 1.820451(ASP) | 0.359 | Plastic | 1.633 | 23.4 | −4.81 |
| 4 | | 1.051801(ASP) | 1.109 | | | | |
| 5 | Ape. Stop | Plano | 0.070 | | | | |
| 6 | Lens 3 | 6.617491(ASP) | 0.628 | Plastic | 1.535 | 56.3 | 3.65 |
| 7 | | −2.675155(ASP) | 0.415 | | | | |
| 8 | Lens 4 | 5.654344(ASP) | 0.478 | Plastic | 1.633 | 23.4 | −16.01 |
| 9 | | 3.510060(ASP) | 0.600 | | | | |
| 10 | Lens 5 | −3.561431(ASP) | 1.011 | Plastic | 1.530 | 55.8 | −17.02 |
| 11 | | −6.463534(ASP) | 0.405 | | | | |
| 12 | IR-filter | Plano | 0.210 | Glass | 1.517 | 64.2 | — |
| 13 | | Plano | 0.676 | | | | |
| 14 | Image | Plano | — | | | | |

Note:
Reference wavelength is 587.6 nm.
ASP stands for aspherical surfaces.

The optical data of this preferred embodiment are listed in Table 4, wherein the object-side surfaces and the image-side surfaces of the first lens element (210) to the fifth lens element (250) comply with the aspherical surface formula as given in Equation (18), and their aspheric coefficients are listed in Table 5 as follows:

TABLE 5

Aspheric coefficients of this preferred embodiment

| | Surface # | | | | |
|---|---|---|---|---|---|
| | 1 | 2 | 3 | 4 | 6 |
| k = | −3.65664E−01 | 2.28398E+01 | 1.77365E−02 | −9.11314E−02 | −1.00000E+02 |
| A4 = | −4.84203E−03 | −3.36296E−03 | −6.41410E−02 | −1.24991E−01 | 2.57710E−02 |
| A6 = | −6.06288E−03 | 9.17259E−03 | 8.44817E−02 | 1.03755E−01 | −2.67081E−01 |
| A8 = | 7.25397E−04 | −6.37005E−03 | −4.34774E−02 | −6.86605E−02 | 7.50552E−01 |
| A10 = | 6.81978E−05 | 2.04943E−03 | 8.61614E−03 | −1.40912E−02 | −1.36344E+00 |
| A12 = | −1.72862E−06 | −2.30263E−04 | −9.05963E−04 | −9.40184E−03 | 8.28063E−01 |

| | Surface # | | | | |
|---|---|---|---|---|---|
| | 7 | 8 | 9 | 10 | 11 |
| k = | −1.53416E+00 | −1.00000E+02 | 8.55594E−01 | 6.47926E−01 | 6.34296E+00 |
| A4 = | −1.63657E−01 | −1.75618E−01 | −1.00705E−01 | 3.11179E−02 | −8.19822E−02 |
| A6 = | −3.34230E−02 | −9.45696E−02 | −4.50422E−02 | −1.26168E−02 | 1.02585E−02 |
| A8 = | 1.24733E−01 | 6.10633E−02 | 7.19854E−02 | 6.47357E−03 | −1.18246E−03 |
| A10 = | −1.83911E−01 | −1.92431E−02 | −4.32510E−02 | −1.67302E−03 | 2.80278E−04 |
| A12 = | 3.59911E−02 | −8.86395E−03 | 1.25925E−02 | 6.96899E−05 | −1.21854E−05 |

TABLE 5-continued

Aspheric coefficients of this preferred embodiment

| | | | | |
|---|---|---|---|---|
| A14 = | 7.92495E−03 | −1.59411E−03 | 2.29323E−05 | −6.85169E−06 |
| A16 = | | | −9.45958E−07 | 4.56560E−06 |

With reference to Table 4 and FIG. 2B for the optical lens assembly for image taking of this preferred embodiment, the focal length of the optical lens assembly for image taking is f=5.66 (mm), the overall aperture value (f-number) of the optical lens assembly for image taking is Fno=3.00, the half of maximum field view angle is HFOV=34.0°. After the optical data of this preferred embodiment are calculated and derived, the optical lens assembly satisfies related relations as shown in Table 6 below, and the related symbols have been described above and thus will not be described again.

TABLE 6

Data of related relations of this preferred embodiment

| Relation | Data | Relation | Data |
|---|---|---|---|
| $v_1 - v_2$ | 32.4 | $f/f_1$ | 1.11 |
| $v_3 - v_4$ | 32.9 | $f/f_2$ | −1.18 |
| $T_{34}/T_{45}$ | 0.7 | $f/f_3$ | 1.55 |
| $R_1/R_2$ | 0.21 | $f/f_4$ | −0.35 |
| $R_9/f$ | −0.63 | BFL/TTL | 0.18 |
| $(R_3 - R_4)/(R_3 + R_4)$ | 0.27 | $S_d/T_d$ | 0.56 |
| $(R_5 + R_6)/(R_5 - R_6)$ | 0.42 | | |

According to the optical data as shown in Table 4 and the series of aberration curves as shown in FIG. 2B, the optical lens assembly for image taking in accordance with this preferred embodiment of the present invention provides good correction results in aspects of the longitudinal spherical aberration, astigmatic field curving, and distortion.

Third Preferred Embodiment

Figure 3A:
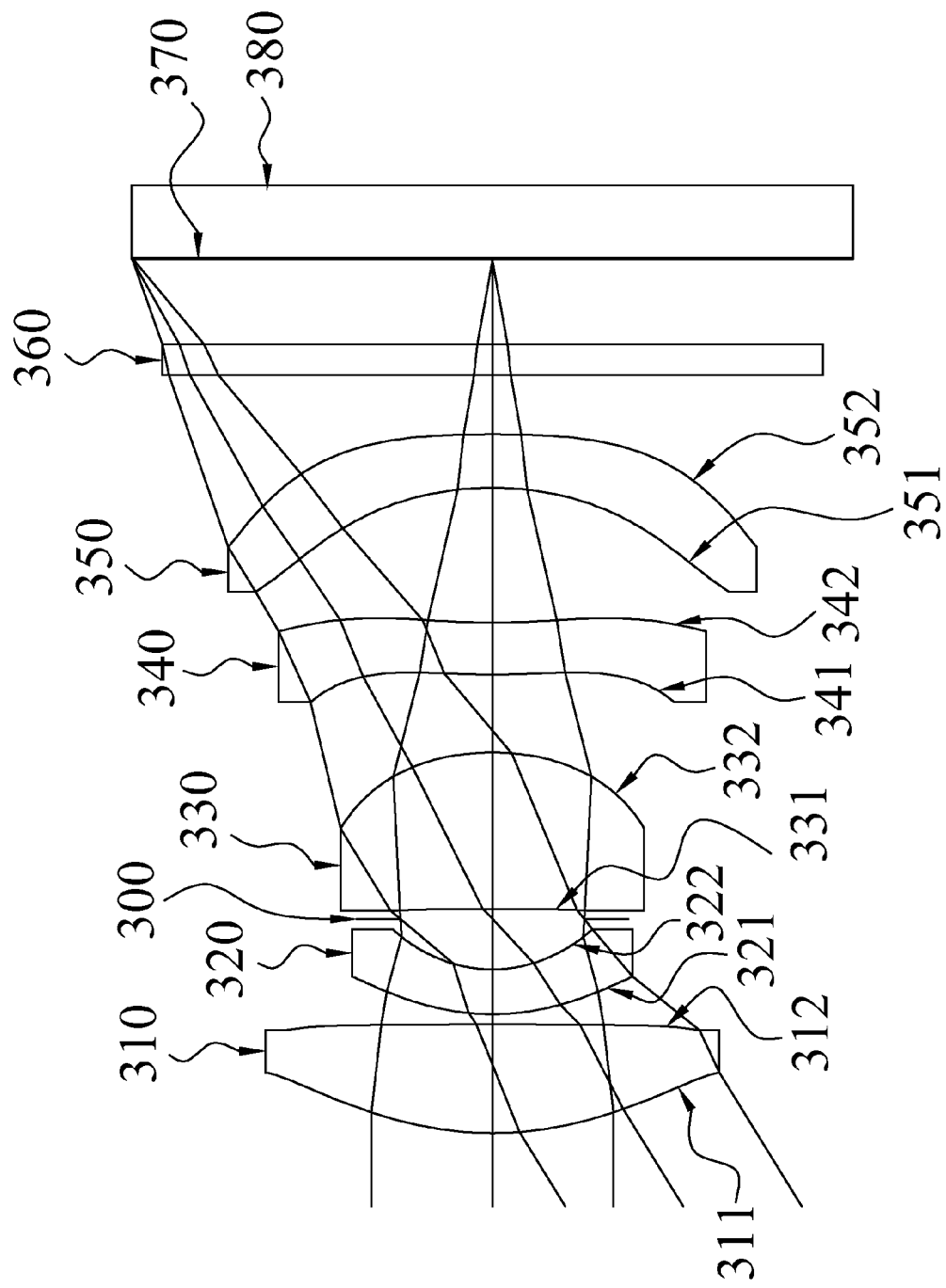
FIG. 3A is a schematic view of an optical lens assembly for image taking in accordance with the third preferred embodiment of the present invention.
Figure 3B:
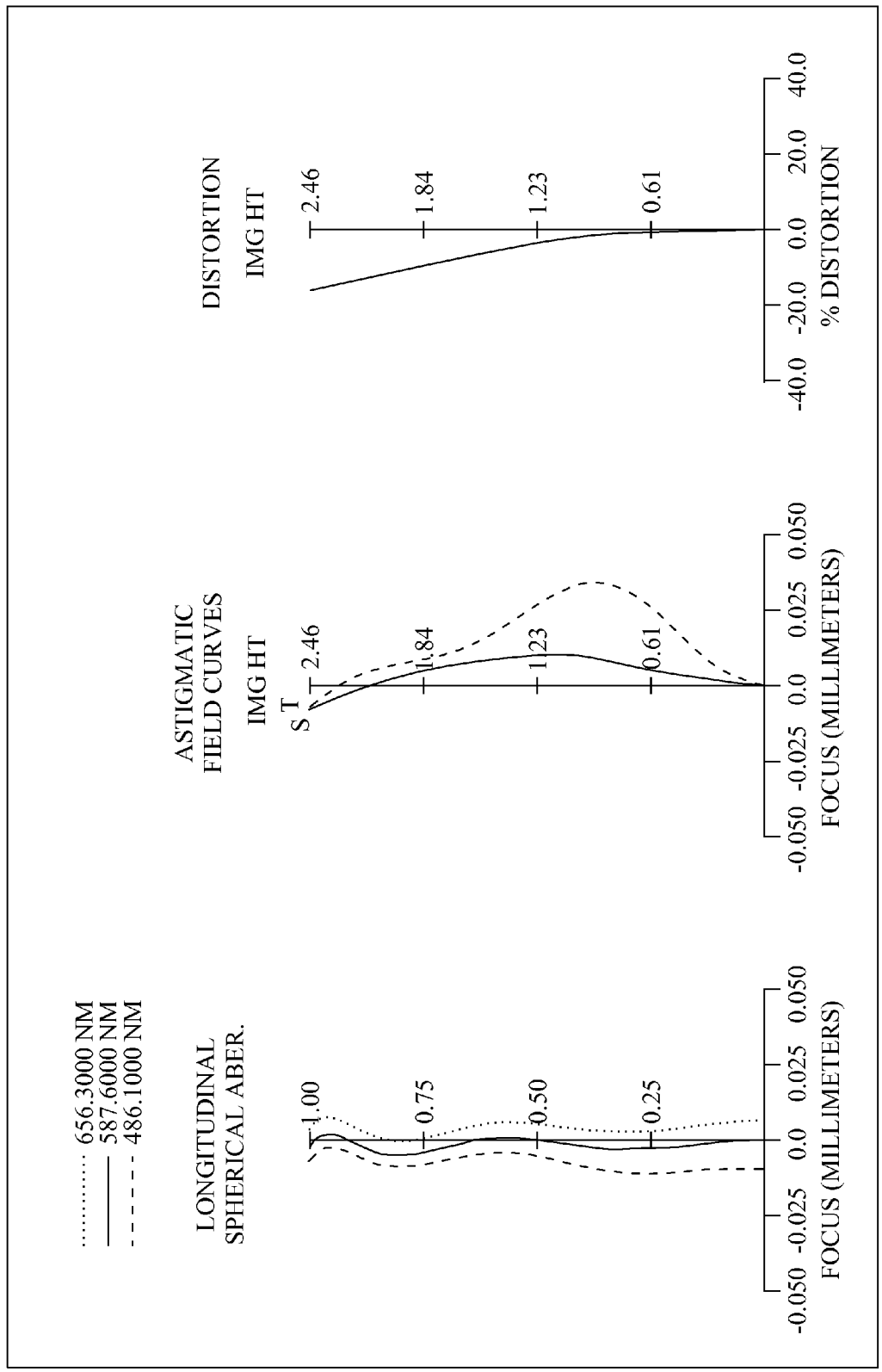
FIG. 3B is a series of aberration curves of the third preferred embodiment of the present invention.

With reference to FIGS. 3A and 3B for a schematic view of an optical lens assembly for image taking and a series of aberration curves in accordance with the third preferred embodiment of the present invention respectively, the optical lens assembly for image taking comprises five lens elements, a stop and an IR-filter (360). More specifically, the stop can be an aperture stop (300), and the optical lens assembly for image taking, sequentially arranged from an object side to an image side along an optical axis, comprises: a plastic first lens element (310) with positive refractive power, having a convex object-side surface (311) and a convex image-side surface (312), and both object-side surface (311) and image-side surface (312) thereof being aspheric; a plastic second lens element (320) with negative refractive power, having a convex object-side surface (321) and a concave image-side surface (322), and both object-side surface (321) and image-side surface (322) thereof being aspheric; the aperture stop (300); a plastic third lens element (330) with positive refractive power, having a concave object-side surface (331) and a convex image-side surface (332), and both object-side surface (331) and image-side surface (332) thereof being aspheric; a plastic fourth lens element (340) with negative refractive power, having a convex object-side surface (341) and a concave image-side surface (342), and both object-side surface (341) and image-side surface (342) thereof being aspheric; a plastic fifth lens element (350) with negative refractive power, having a concave object-side surface (351) and a convex image-side surface (352), and both object-side surface (351) and image-side surface (352) thereof being aspheric; the IR-filter (360), made of glass, being a plate glass provided for adjusting the wavelength range of the light for imaging; an image sensor (380) at the image plane (370). With the combination of the five lens elements, the aperture stop (300) and the IR-filter (360), an image of the photographed object can be formed and projected onto the image sensor (380).

TABLE 7

Optical data of this preferred embodiment
f = 4.78 mm, Fno = 2.90, HFOV = 31.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.369825(ASP) | 0.742 | Plastic | 1.514 | 56.8 | 4.49 |
| 2 | | −73.466279(ASP) | 0.070 | | | | |
| 3 | Lens 2 | 1.585352(ASP) | 0.305 | Plastic | 1.633 | 23.4 | −4.04 |
| 4 | | 0.905890(ASP) | 0.344 | | | | |
| 5 | Ape. Stop | Plano | 0.070 | | | | |
| 6 | Lens 3 | −48.172733(ASP) | 1.068 | Plastic | 1.535 | 56.3 | 3.25 |
| 7 | | −1.690411(ASP) | 0.533 | | | | |
| 8 | Lens 4 | 4.995464(ASP) | 0.355 | Plastic | 1.633 | 23.4 | −184.53 |
| 9 | | 4.658611(ASP) | 0.921 | | | | |
| 10 | Lens 5 | −2.181280(ASP) | 0.366 | Plastic | 1.535 | 56.3 | −5.48 |
| 11 | | −9.035690(ASP) | 0.405 | | | | |
| 12 | IR-filter | Plano | 0.210 | Glass | 1.517 | 64.2 | — |
| 13 | | Plano | 0.586 | | | | |
| 14 | Image | Plano | — | | | | |

Note:
Reference wavelength is 587.6 nm.
ASP stands for aspherical surfaces.

The optical data of this preferred embodiment are listed in Table 7, wherein the object-side surfaces and the image-side surfaces of the first lens element (310) to the fifth lens element (350) comply with the aspherical surface formula as given in Equation (18), and their aspheric coefficients are listed in Table 8 as follows:

TABLE 8

Aspheric coefficients of this preferred embodiment

| Surface # | 1 | 2 | 3 | 4 | 6 |
|---|---|---|---|---|---|
| k = | −5.03382E−01 | −9.85753E+01 | −3.70371E−01 | 2.70016E−02 | 9.85753E+01 |
| A4 = | −7.79479E−03 | 1.10056E−04 | −8.15439E−02 | −1.68877E−01 | −1.30604E−02 |
| A6 = | −6.55346E−03 | 5.93450E−03 | 6.16630E−02 | 2.41886E−02 | −2.12854E−01 |
| A8 = | 1.78466E−03 | −7.78095E−03 | −4.08014E−02 | −2.15193E−02 | 8.64194E−01 |
| A10 = | 1.48055E−04 | 2.05751E−03 | 5.69326E−03 | −8.01246E−02 | −1.82552E+00 |
| A12 = | −2.96263E−04 | −2.55197E−04 | −7.69179E−03 | 8.10368E−02 | 1.53268E+00 |

| Surface # | 7 | 8 | 9 | 10 | 11 |
|---|---|---|---|---|---|
| k = | −1.62802E+00 | −7.38931E+01 | 3.46857E+00 | 1.68191E−01 | 1.40256E+01 |
| A4 = | −1.45940E−01 | −9.95861E−02 | −9.92647E−02 | −2.05305E−02 | −6.57721E−02 |
| A6 = | −2.48340E−02 | −6.50342E−02 | −3.12987E−02 | −6.40370E−03 | 5.92159E−03 |
| A8 = | 6.84441E−02 | 7.78150E−02 | 7.16008E−02 | 8.19318E−03 | −8.80514E−04 |
| A10 = | −1.06978E−01 | −1.94907E−02 | −4.42569E−02 | −1.22946E−03 | 1.42304E−04 |
| A12 = | 2.67007E−02 | −1.66671E−02 | 1.24135E−02 | 1.67017E−04 | −5.50847E−05 |
| A14 = | | 7.17302E−03 | −1.31004E−03 | 3.88966E−05 | −7.72666E−06 |
| A16 = | | | | −1.18201E−05 | 6.61565E−06 |

With reference to Table 7 and FIG. 3B for the optical lens assembly for image taking of this preferred embodiment, the focal length of the optical lens assembly for image taking is f=4.78 (mm), the overall aperture value (f-number) of the optical lens assembly for image taking is Fno=2.90, the half of maximum field view angle is HFOV=31.5°. After the optical data of this preferred embodiment are calculated and derived, the optical lens assembly satisfies related relations as shown in Table 9 below, and the related symbols have been described above and thus will not be described again.

TABLE 9

Data of related relations of this preferred embodiment

| Relation | Data | Relation | Data |
|---|---|---|---|
| $v_1 - v_2$ | 33.4 | $f/f_1$ | 1.07 |
| $v_3 - v_4$ | 32.9 | $f/f_2$ | −1.18 |
| $T_{34}/T_{45}$ | 0.6 | $f/f_3$ | 1.47 |
| $R_1/R_2$ | −0.03 | $f/f_4$ | −0.03 |
| $R_9/f$ | −0.46 | BFL/TTL | 0.19 |
| $(R_3 - R_4)/(R_3 + R_4)$ | 0.27 | $S_d/T_d$ | 0.69 |
| $(R_5 + R_6)/(R_5 - R_6)$ | 1.07 | | |

According to the optical data as shown in Table 7 and the series of aberration curves as shown in FIG. 3B, the optical lens assembly for image taking in accordance with this preferred embodiment of the present invention provides good correction results in aspects of the longitudinal spherical aberration, astigmatic field curving, and distortion.

Fourth Preferred Embodiment

Figure 4A:
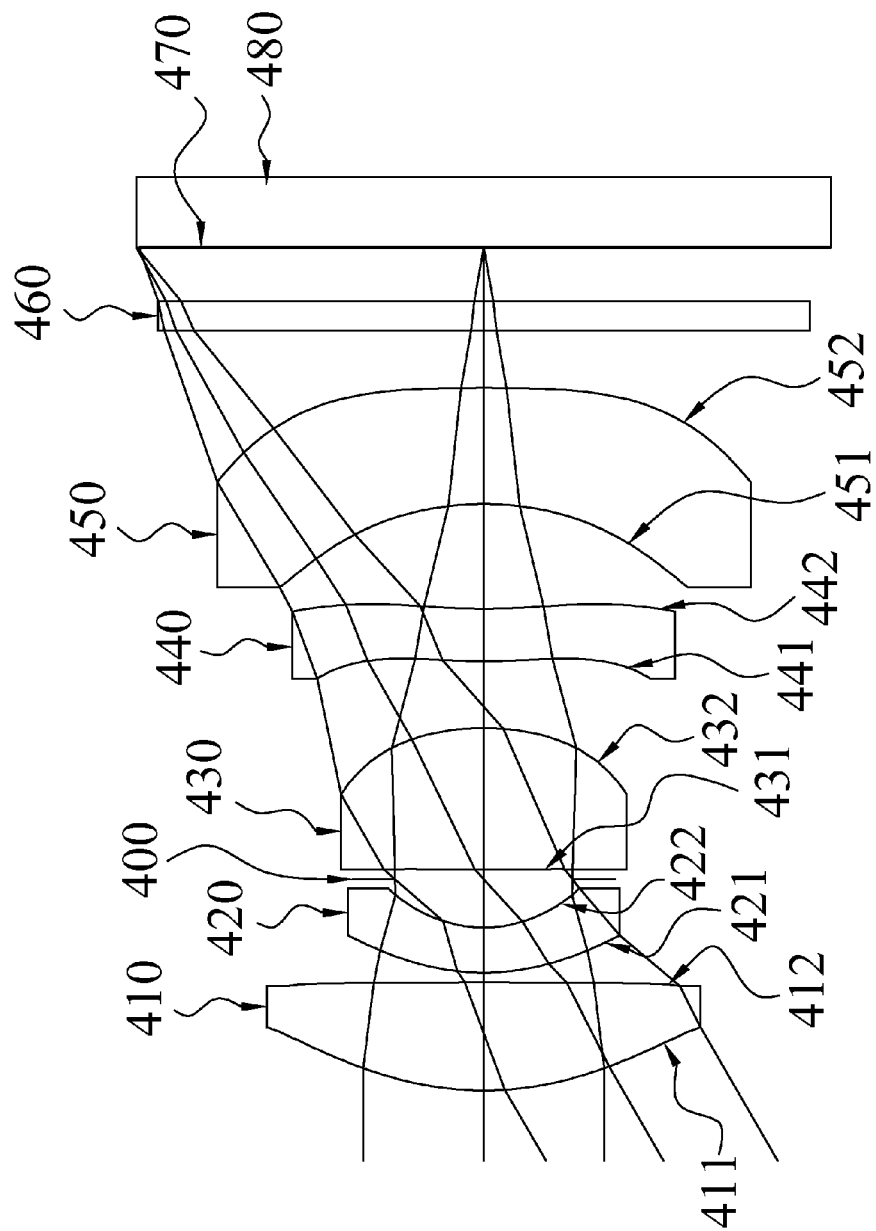
FIG. 4A is a schematic view of an optical lens assembly for image taking in accordance with the fourth preferred embodiment of the present invention.
Figure 4B:
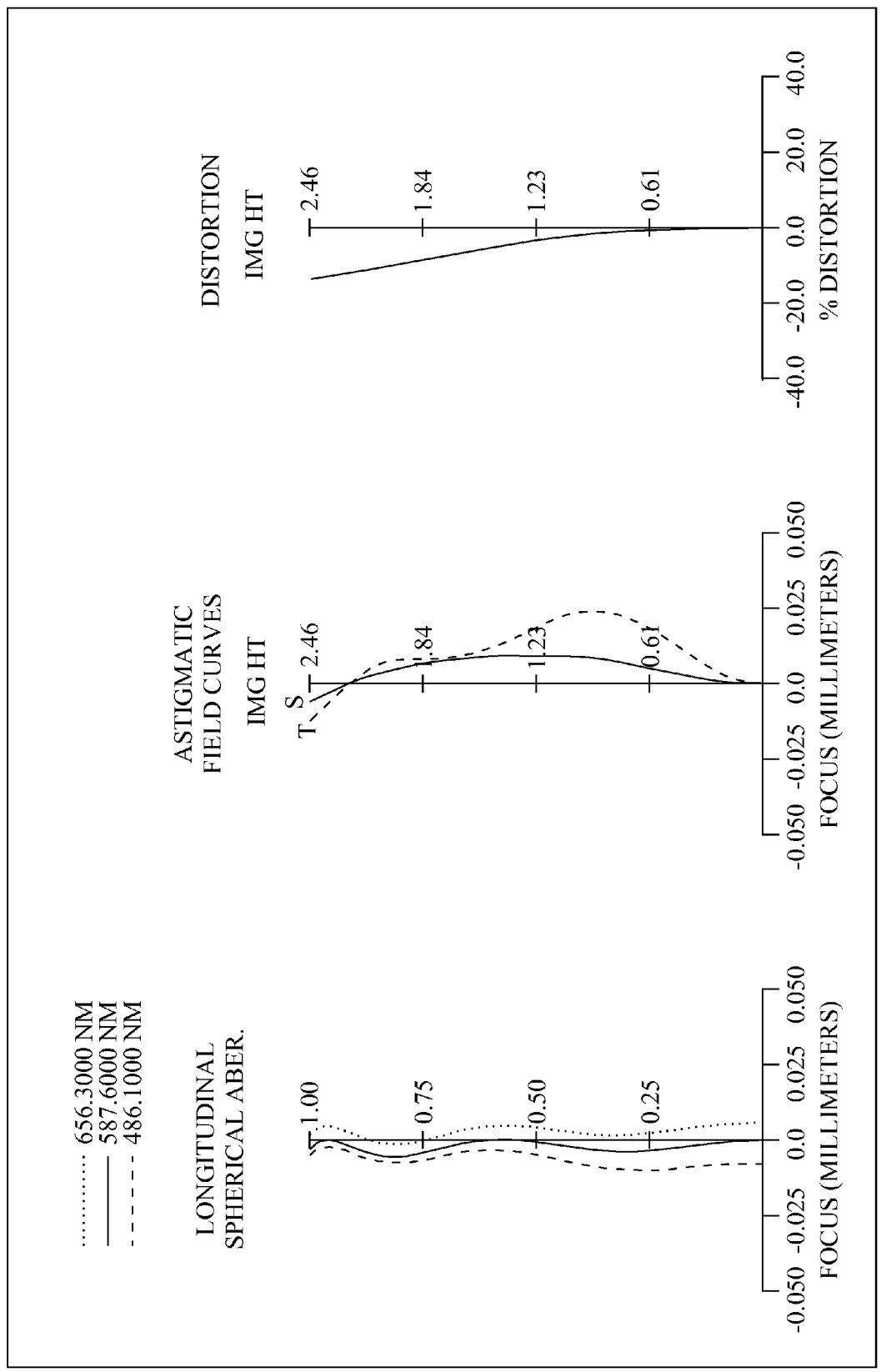
FIG. 4B is a series of aberration curves of the fourth preferred embodiment of the present invention.

With reference to FIGS. 4A and 4B for a schematic view of an optical lens assembly for image taking and a series of aberration curves in accordance with the fourth preferred embodiment of the present invention respectively, the optical lens assembly for image taking comprises five lens elements, a stop and an IR-filter (460). More specifically, the stop can be an aperture stop (400), and the optical lens assembly for image taking, sequentially arranged from an object side to an image side along an optical axis, comprises: a plastic first lens element (410) with positive refractive power, having a convex object-side surface (411) and a convex image-side surface (412), and both object-side surface (411) and image-side surface (412) thereof being aspheric; a plastic second lens element (420) with negative refractive power, having a convex object-side surface (421) and a concave image-side surface (422), and both object-side surface (421) and image-side surface (422) thereof being aspheric; the aperture stop (400); a plastic third lens element (430) with positive refractive power, having a convex object-side surface (431) and a convex image-side surface (432), and both object-side surface (431) and image-side surface (432) thereof being aspheric; a plastic fourth lens element (440) with positive refractive power, having a convex object-side surface (441) and a concave image-side surface (442), and both object-side surface (441) and image-side surface (442) thereof being aspheric; a plastic fifth lens element (450) with negative refractive power, having a concave object-side surface (451) and a convex image-side surface (452), and both object-side surface (451) and image-side surface (452) thereof being aspheric; the IR-filter (460), made of glass, being a plate glass provided for adjusting the wavelength range of the light for imaging; an image sensor (480) at the image plane (470). With the combination of the five lens elements, the aperture stop (400) and the IR-filter (460), an image of the photographed object can be formed and projected onto the image sensor (480).

TABLE 10

Optical data of this preferred embodiment
f = 4.95 mm, Fno = 2.90, HFOV = 30.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.250868(ASP) | 0.765 | Plastic | 1.535 | 56.3 | 4.12 |
| 2 | | −89.689579(ASP) | 0.070 | | | | |
| 3 | Lens 2 | 1.623401(ASP) | 0.320 | Plastic | 1.633 | 23.4 | −3.78 |
| 4 | | 0.893401(ASP) | 0.343 | | | | |
| 5 | Ape. Stop | Plano | 0.070 | | | | |
| 6 | Lens 3 | 28.839773(ASP) | 1.001 | Plastic | 1.535 | 56.3 | 3.33 |
| 7 | | −1.876143(ASP) | 0.475 | | | | |
| 8 | Lens 4 | 4.526045(ASP) | 0.372 | Plastic | 1.633 | 23.4 | 232.57 |
| 9 | | 4.520967(ASP) | 0.742 | | | | |
| 10 | Lens 5 | −2.144538(ASP) | 0.823 | Plastic | 1.535 | 56.3 | −4.67 |
| 11 | | −17.220438(ASP) | 0.405 | | | | |
| 12 | IR-filter | Plano | 0.210 | Glass | 1.517 | 64.2 | — |
| 13 | | Plano | 0.381 | | | | |
| 14 | Image | Plano | — | | | | |

Note:
Reference wavelength is 587.6 nm.
ASP stands for aspherical surfaces.

The optical data of this preferred embodiment are listed in Table 10, wherein the object-side surfaces and the image-side surfaces of the first lens element (410) to the fifth lens element (450) comply with the aspherical surface formula as given in Equation (18), and their aspheric coefficients are listed in Table 11 as follows:

TABLE 11

Aspheric coefficients of this preferred embodiment

| | Surface # | | | | |
|---|---|---|---|---|---|
| | 1 | 2 | 3 | 4 | 6 |
| k = | −5.09207E−01 | −2.00000E+01 | −2.23879E−01 | −6.09990E−03 | 2.00000E+01 |
| A4 = | −7.15633E−03 | 8.50369E−04 | −7.49518E−02 | −1.52760E−01 | −7.48082E−03 |
| A6 = | −7.05949E−03 | 6.43076E−03 | 6.48490E−02 | 2.41036E−02 | −2.19696E−01 |
| A8 = | 1.69791E−03 | −7.49825E−03 | −4.30727E−02 | 1.34888E−02 | 9.10733E−01 |
| A10 = | 2.00151E−04 | 2.17364E−03 | 7.58558E−03 | −1.58333E−01 | −1.90132E+00 |
| A12 = | −2.43556E−04 | −2.98561E−04 | −8.25671E−03 | 8.10358E−02 | 1.53268E+00 |

| | Surface # | | | | |
|---|---|---|---|---|---|
| | 7 | 8 | 9 | 10 | 11 |
| k = | −1.30817E+00 | −5.88810E+01 | 3.49962E+00 | 1.46211E−01 | 9.94439E+00 |
| A4 = | −1.52908E−01 | −1.01018E−01 | −9.97947E−02 | −1.32820E−02 | −5.07063E−02 |
| A6 = | −2.15067E−02 | −6.24868E−02 | −3.05221E−02 | −8.20658E−03 | 3.33832E−03 |
| A8 = | 7.12924E−02 | 7.92817E−02 | 7.18229E−02 | 7.79055E−03 | −8.34969E−04 |
| A10 = | −1.21223E−01 | −1.92772E−02 | −4.41271E−02 | −1.37644E−03 | 2.69938E−04 |
| A12 = | 3.20878E−02 | −1.68013E−02 | 1.24205E−02 | 1.42520E−04 | −3.75421E−05 |
| A14 = | | 6.77767E−03 | −1.34646E−03 | 5.32309E−05 | −1.21513E−05 |
| A16 = | | | | 7.98565E−06 | 3.05664E−06 |

With reference to Table 10 and FIG. 4B for the optical lens assembly for image taking of this preferred embodiment, the focal length of the optical lens assembly for image taking is f=4.95 (mm), the overall aperture value (f-number) of the optical lens assembly for image taking is Fno=2.90, the half of maximum field view angle is HFOV=30.0°. After the optical data of this preferred embodiment are calculated and derived, the optical lens assembly satisfies related relations as shown in Table 12 below, and the related symbols have been described above and thus will not be described again.

TABLE 12

Data of related relations of this preferred embodiment

| Relation | Data | Relation | Data |
|---|---|---|---|
| $v_1 - v_2$ | 32.9 | $f/f_1$ | 1.20 |
| $v_3 - v_4$ | 32.9 | $f/f_2$ | −1.31 |
| $T_{34}/T_{45}$ | 0.6 | $f/f_3$ | 1.49 |
| $R_1/R_2$ | −0.03 | $f/f_4$ | 0.02 |
| $R_9/f$ | −0.43 | BFL/TTL | 0.16 |
| $(R_3 - R_4)/(R_3 + R_4)$ | 0.29 | $S_d/T_d$ | 0.70 |
| $(R_5 + R_6)/(R_5 - R_6)$ | 0.88 | | |

According to the optical data as shown in Table 10 and the series of aberration curves as shown in FIG. 4B, the optical lens assembly for image taking in accordance with this preferred embodiment of the present invention provides good correction results in aspects of the longitudinal spherical aberration, astigmatic field curving, and distortion.

Fifth Preferred Embodiment

Figure 5A:
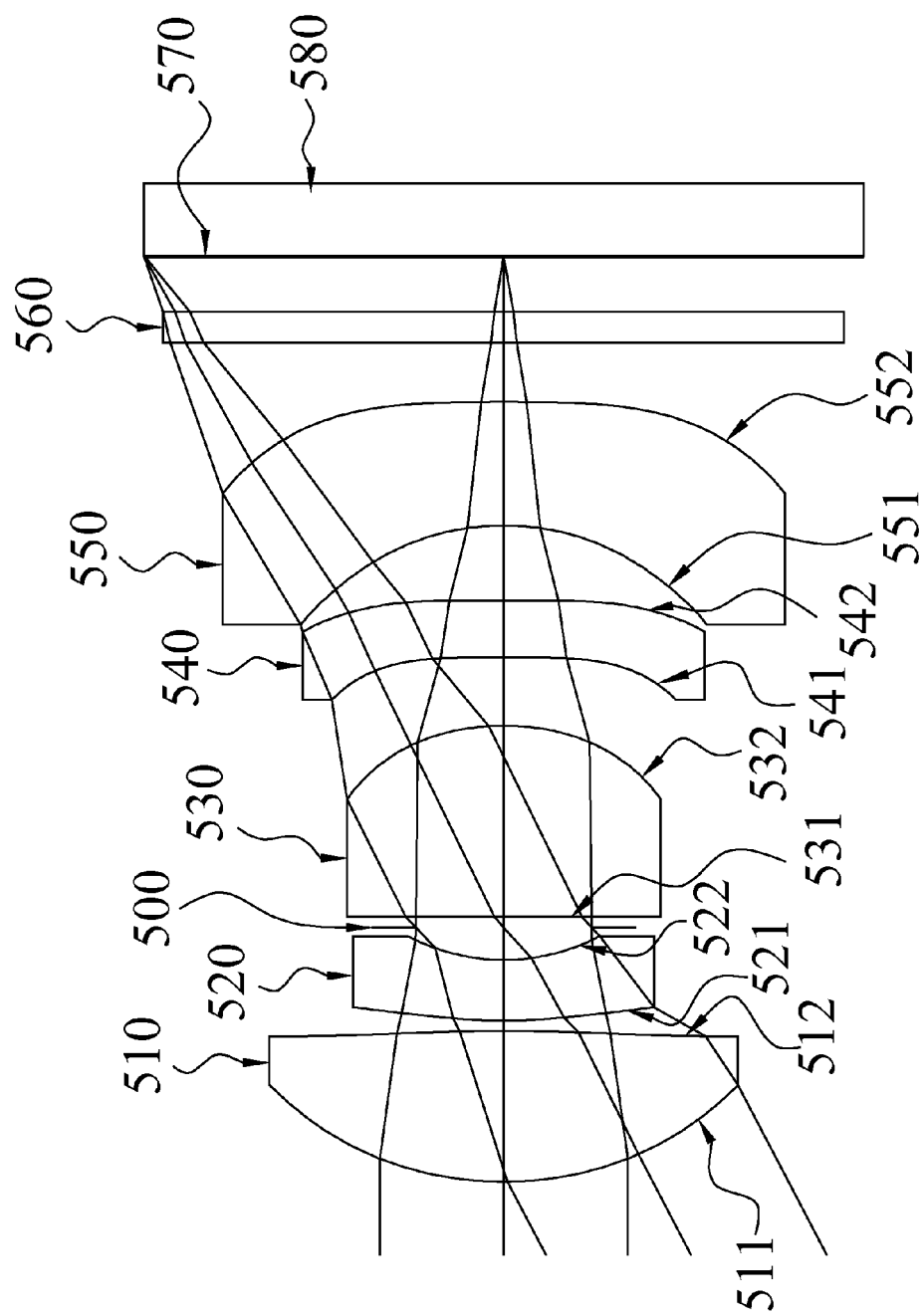
FIG. 5A is a schematic view of an optical lens assembly for image taking in accordance with the fifth preferred embodiment of the present invention.
Figure 5B:
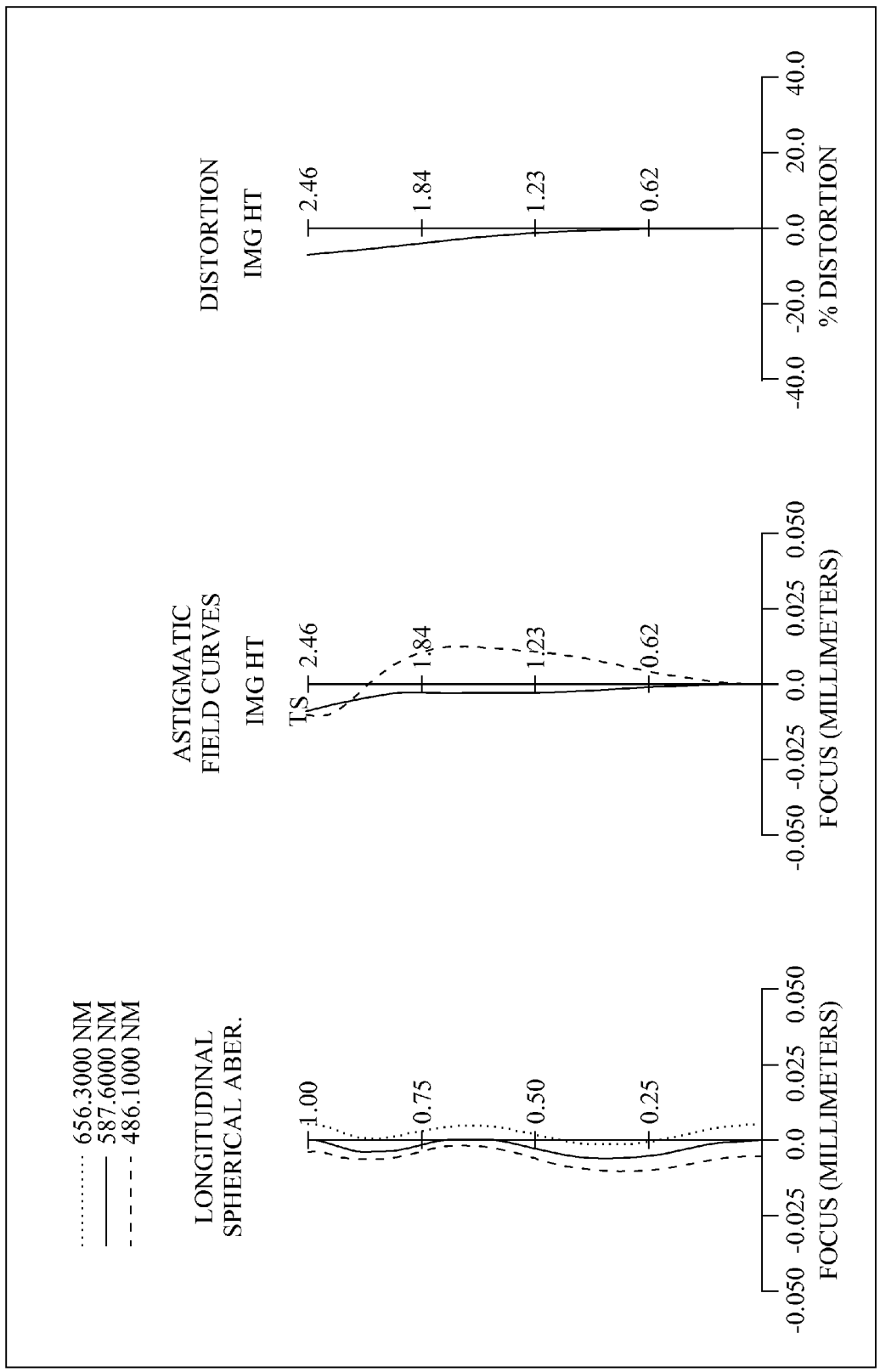
FIG. 5B is a series of aberration curves of the fifth preferred embodiment of the present invention.

With reference to FIGS. 5A and 5B for a schematic view of an optical lens assembly for image taking and a series of aberration curves in accordance with the fifth preferred embodiment of the present invention respectively, the optical lens assembly for image taking comprises five lens elements, a stop and an IR-filter (560). More specifically, the stop can be an aperture stop (500), and the optical lens assembly for image taking, sequentially arranged from an object side to an image side along an optical axis, comprises: a plastic first lens element (510) with positive refractive power, having a convex object-side surface (511) and a convex image-side surface (512), and both object-side surface (511) and image-side surface (512) thereof being aspheric; a plastic second lens element (520) with negative refractive power, having a convex object-side surface (521) and a concave image-side surface (522), and both object-side surface (521) and image-side surface (522) thereof being aspheric; the aperture stop (500); a plastic third lens element (530) with positive refractive power, having a convex object-side surface (531) and a convex image-side surface (532), and both object-side surface (531) and image-side surface (532) thereof being aspheric; a plastic fourth lens element (540) with negative refractive power, having a concave object-side surface (541) and a concave image-side surface (542), and both object-side surface (541) and image-side surface (542) thereof being aspheric; a plastic fifth lens element (550) with negative refractive power, having a concave object-side surface (551) and a convex image-side surface (552), and both object-side surface (551) and image-side surface (552) thereof being aspheric; the IR-filter (560), made of glass, being a plate glass provided for adjusting the wavelength range of the light for imaging; an image sensor (580) at the image plane (570). With the combination of the five lens elements, the aperture stop (500) and the IR-filter (560), an image of the photographed object can be formed and projected onto the image sensor (580).

TABLE 13

Optical data of this preferred embodiment
f = 5.08 mm, Fno = 3.00, HFOV = 27.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.403957(ASP) | 1.032 | Plastic | 1.544 | 55.9 | 3.77 |
| 2 | | −11.975371(ASP) | 0.070 | | | | |
| 3 | Lens 2 | 3.368716(ASP) | 0.415 | Plastic | 1.614 | 25.6 | −3.67 |
| 4 | | 1.287880(ASP) | 0.224 | | | | |
| 5 | Ape. Stop | Plano | 0.073 | | | | |
| 6 | Lens 3 | 32.925096(ASP) | 1.308 | Plastic | 1.544 | 55.9 | 3.06 |
| 7 | | −1.728227(ASP) | 0.467 | | | | |
| 8 | Lens 4 | −302.236702(ASP) | 0.391 | Plastic | 1.607 | 26.6 | −382.13 |
| 9 | | 1000.000000(ASP) | 0.512 | | | | |
| 10 | Lens 5 | −1.780382(ASP) | 0.847 | Plastic | 1.544 | 55.9 | −3.58 |
| 11 | | −24.390244(ASP) | 0.405 | | | | |
| 12 | IR-filter | Plano | 0.210 | Glass | 1.517 | 64.2 | — |
| 13 | | Plano | 0.381 | | | | |
| 14 | Image | Plano | — | | | | |

Note:
Reference wavelength is 587.6 nm.
ASP stands for aspherical surfaces.

The optical data of this preferred embodiment are listed in Table 13, wherein the object-side surfaces and the image-side surfaces of the first lens element (510) to the fifth lens element (550) comply with the aspherical surface formula as given in Equation (18), and their aspheric coefficients are listed in Table 14 as follows:

TABLE 14

Aspheric coefficients of this preferred embodiment

| | Surface # | | | | |
|---|---|---|---|---|---|
| | 1 | 2 | 3 | 4 | 6 |
| k = | 3.48618E−01 | −2.00000E+01 | −2.81273E+00 | 2.31916E−01 | 6.22669E+00 |
| A4 = | 3.77036E−03 | 1.23963E−02 | −1.03029E−01 | −1.57378E−01 | −1.10292E−02 |
| A6 = | −1.26794E−03 | 5.33511E−03 | 5.79647E−02 | 9.00249E−02 | −2.17692E−01 |
| A8 = | 9.07561E−04 | −6.88388E−03 | −8.30148E−03 | −1.17293E−02 | 8.82021E−01 |
| A10 = | −1.59916E−04 | 2.58305E−03 | −5.69145E−04 | 1.76621E−01 | −1.80251E+00 |
| A12 = | −5.87421E−05 | −3.57936E−04 | −2.31691E−04 | 8.20698E−02 | 1.53165E+00 |

TABLE 14-continued

Aspheric coefficients of this preferred embodiment

| Surface # | | | | |
|---|---|---|---|---|
| 7 | 8 | 9 | 10 | 11 |
| k = −2.11614E+00 | 2.00000E+01 | 4.50992E+05 | 3.16816E−01 | −1.64795E+02 |
| A4 = −1.32930E−01 | −1.37076E−01 | −6.19679E−02 | −1.32263E−02 | −4.91316E−02 |
| A6 = −1.40989E−02 | −5.18178E−02 | −5.20863E−02 | −1.53579E−03 | 4.10310E−03 |
| A8 = 4.09316E−02 | 7.21959E−02 | 7.61850E−02 | 1.16394E−02 | −6.27601E−04 |
| A10 = −5.40967E−02 | −2.42024E−02 | −4.20107E−02 | 2.41981E−04 | 1.48395E−04 |
| A12 = 1.53839E−02 | −1.60105E−02 | 1.18587E−02 | −2.86766E−04 | −3.30844E−05 |
| A14 = | 8.68884E−03 | −1.66871E−03 | −2.45942E−04 | −7.42664E−06 |
| A16 = | | | 1.32261E−05 | 2.05482E−06 |

With reference to Table 13 and FIG. 5B for the optical lens assembly for image taking of this preferred embodiment, the focal length of the optical lens assembly for image taking is f=5.08 (mm), the overall aperture value (f-number) of the optical lens assembly for image taking is Fno=3.00, the half of maximum field view angle is HFOV=27.5°. After the optical data of this preferred embodiment are calculated and derived, the optical lens assembly satisfies related relations as shown in Table 15 below, and the related symbols have been described above and thus will not be described again.

TABLE 15

Data of related relations of this preferred embodiment

| Relation | Data | Relation | Data |
|---|---|---|---|
| $v_1 - v_2$ | 30.3 | $f/f_1$ | 1.35 |
| $v_3 - v_4$ | 29.3 | $f/f_2$ | −1.38 |
| $T_{34}/T_{45}$ | 0.9 | $f/f_3$ | 1.66 |
| $R_1/R_2$ | −0.20 | $f/f_4$ | −0.01 |
| $R_9/f$ | −0.35 | BFL/TTL | 0.15 |
| $(R_3 - R_4)/(R_3 + R_4)$ | 0.45 | $S_d/T_d$ | 0.67 |
| $(R_5 + R_6)/(R_5 - R_6)$ | 0.90 | | |

According to the optical data as shown in Table 13 and the series of aberration curves as shown in FIG. 5B, the optical lens assembly for image taking in accordance with this preferred embodiment of the present invention provides good correction results in aspects of the longitudinal spherical aberration, astigmatic field curving, and distortion.

Sixth Preferred Embodiment

Figure 6A:
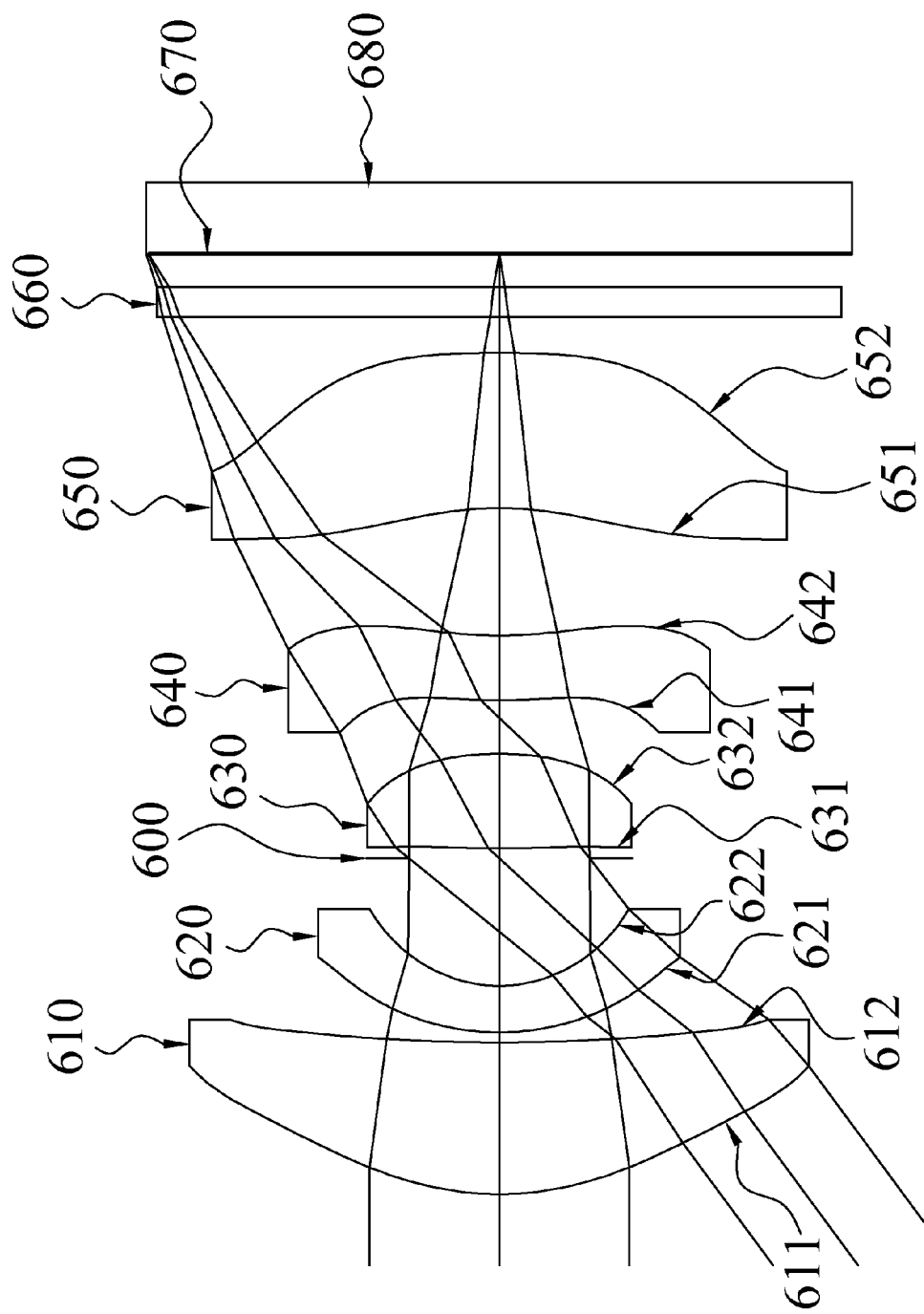
FIG. 6A is a schematic view of an optical lens assembly for image taking in accordance with the sixth preferred embodiment of the present invention.
Figure 6B:
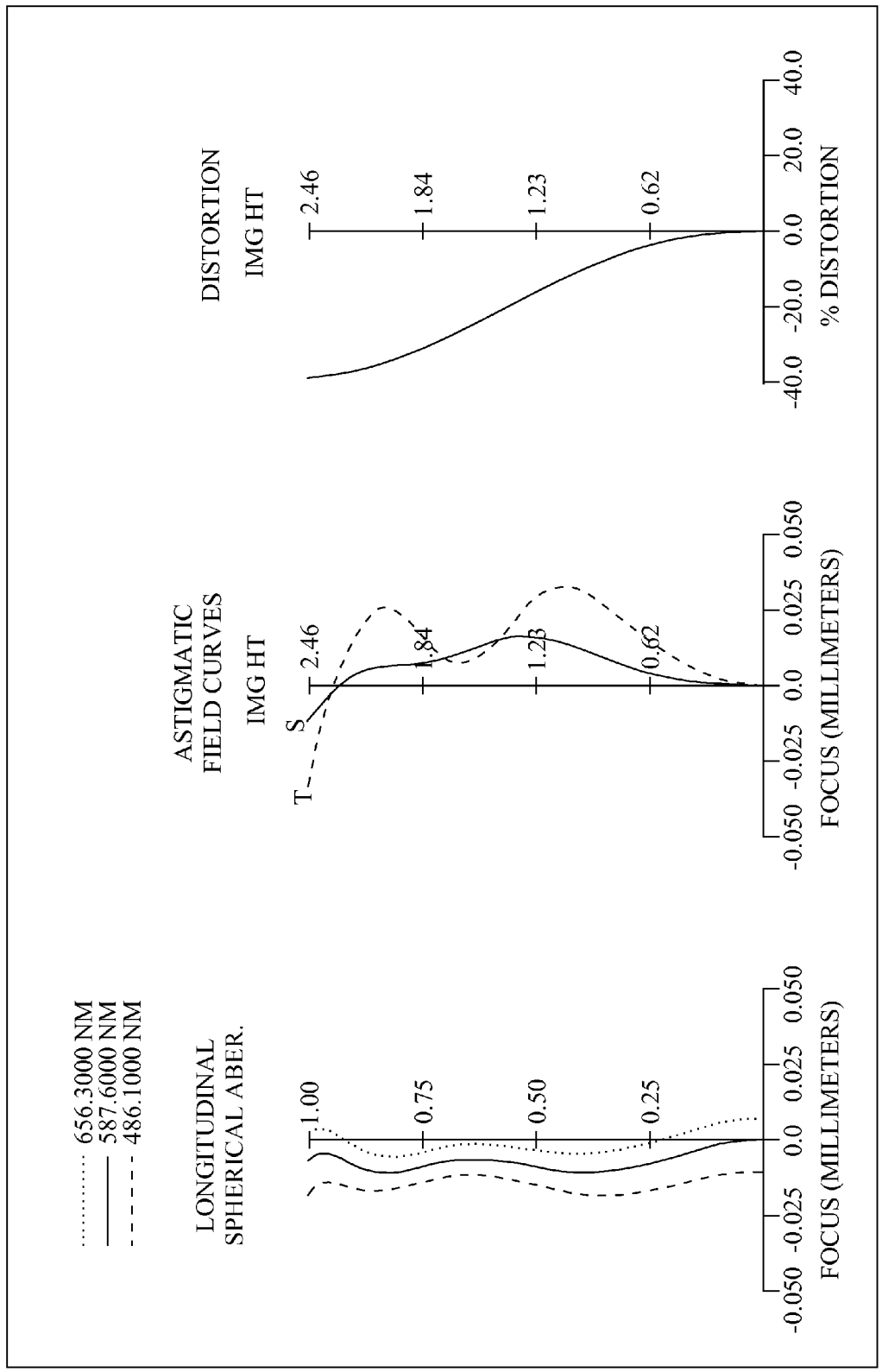
FIG. 6B is a series of aberration curves of the sixth preferred embodiment of the present invention.

With reference to FIGS. 6A and 6B for a schematic view of an optical lens assembly for image taking and a series of aberration curves in accordance with the sixth preferred embodiment of the present invention respectively, the optical lens assembly for image taking comprises five lens elements, a stop and an IR-filter (660). More specifically, the stop can be an aperture stop (600), and the optical lens assembly for image taking, sequentially arranged from an object side to an image side along an optical axis, comprises: a plastic first lens element (610) with positive refractive power, having a convex object-side surface (611) and a concave image-side surface (612), and both object-side surface (611) and image-side surface (612) thereof being aspheric; a plastic second lens element (620) with negative refractive power, having a convex object-side surface (621) and a concave image-side surface (622), and both object-side surface (621) and image-side surface (622) thereof being aspheric; the aperture stop (600); a plastic third lens element (630) with positive refractive power, having a convex object-side surface (631) and a convex image-side surface (632), and both object-side surface (631) and image-side surface (632) thereof being aspheric; a plastic fourth lens element (640) with negative refractive power, having a convex object-side surface (641) and a concave image-side surface (642), and both object-side surface (641) and image-side surface (642) thereof being aspheric; a plastic fifth lens element (650) with negative refractive power, having a concave object-side surface (651) and a convex image-side surface (652), and both object-side surface (651) and image-side surface (652) thereof being aspheric; the IR-filter (660), made of glass, being a plate glass provided for adjusting the wavelength range of the light for imaging; an image sensor (680) at the image plane (670). With the combination of the five lens elements, the aperture stop (600) and the IR-filter (660), an image of the photographed object can be formed and projected onto the image sensor (680).

TABLE 16

Optical data of this preferred embodiment
f = 5.46 mm, Fno = 3.00, HFOV = 36.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.169700(ASP) | 1.064 | Plastic | 1.535 | 56.3 | 4.75 |
| 2 | | 12.304605(ASP) | 0.071 | | | | |
| 3 | Lens 2 | 1.696000(ASP) | 0.326 | Plastic | 1.633 | 23.4 | −4.26 |
| 4 | | 0.963304(ASP) | 0.894 | | | | |
| 5 | Ape. Stop | Plano | 0.070 | | | | |
| 6 | Lens 3 | 8.750431(ASP) | 0.663 | Plastic | 1.535 | 56.3 | 3.41 |
| 7 | | −2.244844(ASP) | 0.375 | | | | |
| 8 | Lens 4 | 3.603967(ASP) | 0.454 | Plastic | 1.633 | 23.4 | −27.13 |
| 9 | | 2.833225(ASP) | 0.894 | | | | |
| 10 | Lens 5 | −2.294771(ASP) | 1.090 | Plastic | 1.535 | 56.3 | −6.24 |

TABLE 16-continued

Optical data of this preferred embodiment
f = 5.46 mm, Fno = 3.00, HFOV = 36.4 deg.

| Surface # | | Curvature Radius | Thickness | Material | Index | Abbe # | Focal Length |
|---|---|---|---|---|---|---|---|
| 11 | | −8.561664(ASP) | 0.250 | | | | |
| 12 | IR-filter | Plano | 0.210 | Glass | 1.517 | 64.2 | — |
| 13 | | Plano | 0.234 | | | | |
| 14 | Image | Plano | — | | | | |

Note:
Reference wavelength is 587.6 nm.
ASP stands for aspherical surfaces.

The optical data of this preferred embodiment are listed in Table 16, wherein the object-side surfaces and the image-side surfaces of the first lens element (610) to the fifth lens element (650) comply with the aspherical surface formula as given in Equation (18), and their aspheric coefficients are listed in Table 17 as follows:

TABLE 17

Aspheric coefficients of this preferred embodiment

| | Surface # | | | | |
|---|---|---|---|---|---|
| | 1 | 2 | 3 | 4 | 6 |
| k = | −5.54366E−01 | −7.97906E+01 | 1.25679E−01 | −6.12449E−02 | 1.41751E+01 |
| A4 = | −4.88427E−03 | −2.37959E−03 | −6.35619E−02 | −1.08937E−01 | −7.03632E−03 |
| A6 = | −6.90477E−03 | 8.90932E−03 | 9.01462E−02 | 8.36215E−02 | −3.32729E−01 |
| A8 = | 5.60333E−04 | −6.76861E−03 | −4.34394E−02 | −6.74902E−04 | 1.12308E+00 |
| A10 = | 8.57935E−05 | 2.06658E−03 | 7.24748E−03 | −4.33012E−02 | −2.17988E+00 |
| A12 = | 9.77121E−07 | −2.04404E−04 | −3.45841E−03 | −7.49280E−02 | 1.45317E+00 |

| | Surface # | | | | |
|---|---|---|---|---|---|
| | 7 | 8 | 9 | 10 | 11 |
| k = | −8.12213E−03 | −3.76802E+01 | 1.31168E−02 | −4.21061E+00 | 1.34046E+01 |
| A4 = | −1.82584E−01 | −1.70295E−01 | −1.18887E−01 | 6.21409E−02 | −8.48285E−02 |
| A6 = | −2.38610E−03 | −8.61622E−02 | −3.44800E−02 | −2.20903E−02 | 1.04310E−02 |
| A8 = | 1.09428E−01 | 7.35811E−02 | 6.94150E−02 | 7.02838E−03 | −5.58629E−04 |
| A10 = | −1.93381E−01 | −2.13760E−02 | −4.40184E−02 | −1.39556E−03 | 4.44359E−04 |
| A12 = | 3.63387E−02 | −1.74569E−02 | 1.26806E−02 | 9.12454E−05 | 4.16587E−06 |
| A14 = | | 1.06428E−02 | −1.51171E−03 | 1.68041E−05 | −1.15354E−05 |
| A16 = | | | | −3.64435E−06 | 6.29081E−07 |

With reference to Table 16 and FIG. 6B for the optical lens assembly for image taking of this preferred embodiment, the focal length of the optical lens assembly for image taking is f=5.46 (mm), the overall aperture value (f-number) of the optical lens assembly for image taking is Fno=3.00, the half of maximum field view angle is HFOV=36.4°. After the optical data of this preferred embodiment are calculated and derived, the optical lens assembly satisfies related relations as shown in Table 18 below, and the related symbols have been described above and thus will not be described again.

TABLE 18

Data of related relations of this preferred embodiment

| Relation | Data | Relation | Data |
|---|---|---|---|
| $v_1 - v_2$ | 32.9 | $f/f_1$ | 1.15 |
| $v_3 - v_4$ | 32.9 | $f/f_2$ | −1.28 |
| $T_{34}/T_{45}$ | 0.4 | $f/f_3$ | 1.60 |
| $R_1/R_2$ | 0.18 | $f/f_4$ | −0.20 |
| $R_9/f$ | −0.42 | BFL/TTL | 0.10 |

TABLE 18-continued

Data of related relations of this preferred embodiment

| Relation | Data | Relation | Data |
|---|---|---|---|
| $(R_3 - R_4)/(R_3 + R_4)$ | 0.28 | $S_d/T_d$ | 0.60 |
| $(R_5 + R_6)/(R_5 - R_6)$ | 0.59 | | |

According to the optical data as shown in Table 16 and the series of aberration curves as shown in FIG. 6B, the optical lens assembly for image taking in accordance with this preferred embodiment of the present invention provides good correction results in aspects of the longitudinal spherical aberration, astigmatic field curving, and distortion.

Seventh Preferred Embodiment

Figure 7A:
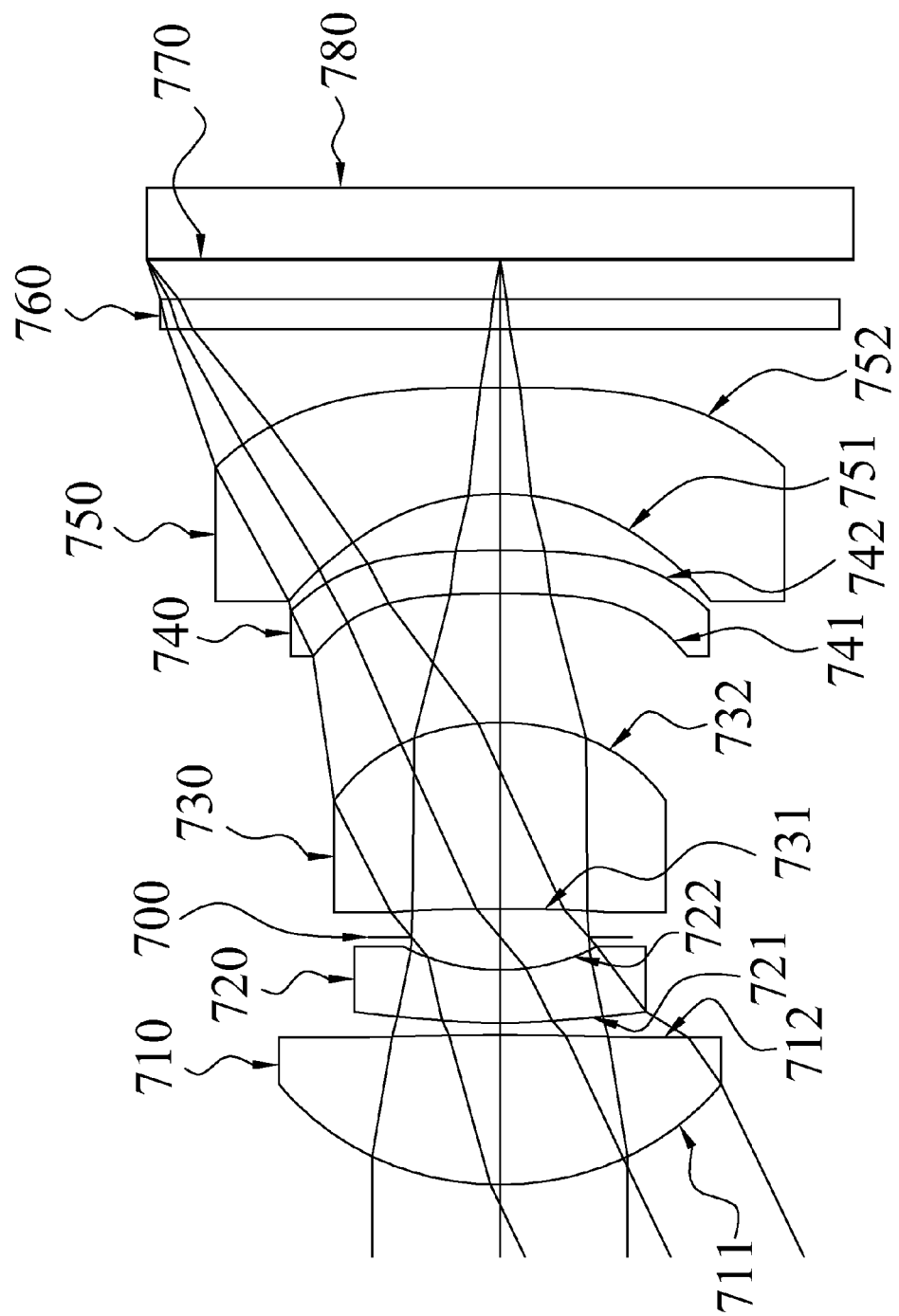
FIG. 7A is a schematic view of an optical lens assembly for image taking in accordance with the seventh preferred embodiment of the present invention.
Figure 7B:
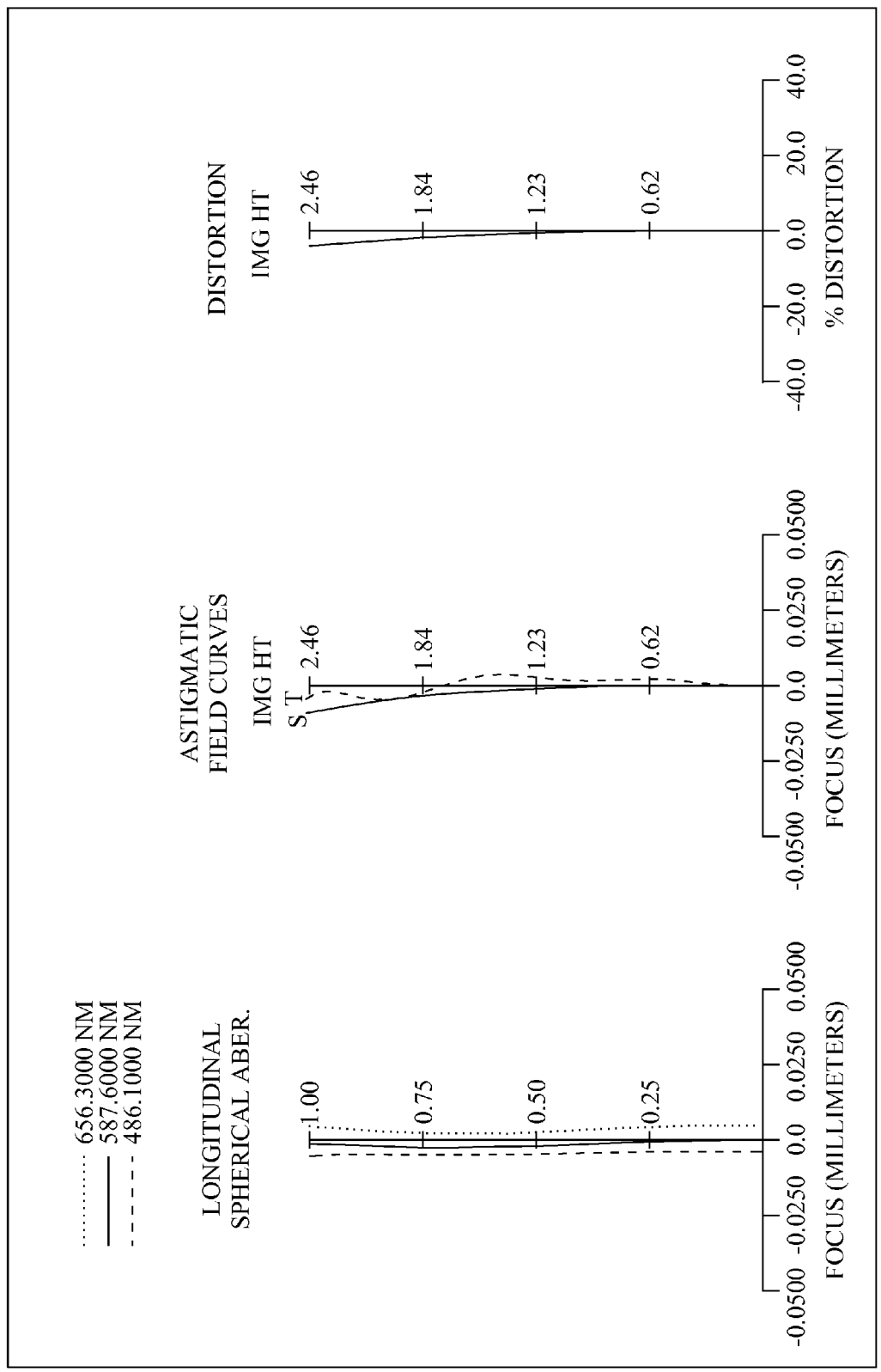
FIG. 7B is a series of aberration curves of the seventh preferred embodiment of the present invention.

With reference to FIGS. 7A and 7B for a schematic view of an optical lens assembly for image taking and a series of aberration curves in accordance with the seventh preferred embodiment of the present invention respectively, the optical lens assembly for image taking comprises five lens elements, a stop and an IR-filter (760). More specifically, the stop can be an aperture stop (700), and the optical lens assembly for image taking, sequentially arranged from an object side to an image side along an optical axis, comprises: a plastic first lens element (710) with positive refractive power, having a convex object-side surface (711) and a convex image-side surface (712), and both object-side surface (711) and image-side surface (712) thereof being aspheric; a plastic second lens element (720) with negative refractive power, having a convex object-side surface (721) and a concave image-side surface (722), and both object-side surface (721) and image-side surface (722) thereof being aspheric; the aperture stop (700); a plastic third lens element (730) with positive refractive power, having a concave object-side surface (731) and a convex image-side surface (732), and both object-side surface (731) and image-side surface (732) thereof being aspheric; a plastic fourth lens element (740) with negative refractive power, having a concave object-side surface (741) and a convex image-side surface (742), and both object-side surface (741) and image-side surface (742) thereof being aspheric; a plastic fifth lens element (750) with negative refractive power, having a concave object-side surface (751) and a convex image-side surface (752), and both object-side surface (751) and image-side surface (752) thereof being aspheric; the IR-filter (760), made of glass, being a plate glass provided for adjusting the wavelength range of the light for imaging; an image sensor (780) at the image plane (770). With the combination of the five lens elements, the aperture stop (700) and the IR-filter (760), an image of the photographed object can be formed and projected onto the image sensor (780).

TABLE 19

Optical data of this preferred embodiment
f = 5.34 mm, Fno = 3.00, HFOV = 25.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.156092(ASP) | 1.043 | Plastic | 1.544 | 55.9 | 3.62 |
| 2 | | −18.855175(ASP) | 0.084 | | | | |
| 3 | Lens 2 | 4.004407(ASP) | 0.369 | Plastic | 1.614 | 25.6 | −3.66 |
| 4 | | 1.388526(ASP) | 0.229 | | | | |
| 5 | Ape. Stop | Plano | 0.197 | | | | |
| 6 | Lens 3 | −25.000000(ASP) | 1.300 | Plastic | 1.544 | 55.9 | 3.40 |
| 7 | | −1.752895(ASP) | 0.900 | | | | |
| 8 | Lens 4 | −8.225193(ASP) | 0.300 | Plastic | 1.650 | 21.4 | −137.54 |
| 9 | | −9.189190(ASP) | 0.394 | | | | |
| 10 | Lens 5 | −1.798193(ASP) | 0.743 | Plastic | 1.530 | 55.8 | −3.71 |
| 11 | | −24.390244(ASP) | 0.405 | | | | |
| 12 | IR-filter | Plano | 0.210 | Glass | 1.517 | 64.2 | — |
| 13 | | Plano | 0.276 | | | | |
| 14 | Image | Plano | — | | | | |

Note:
Reference wavelength is 587.6 nm.
ASP stands for aspherical surfaces.

The optical data of this preferred embodiment are listed in Table 19, wherein the object-side surfaces and the image-side surfaces of the first lens element (710) to the fifth lens element (750) comply with the aspherical surface formula as given in Equation (18), and their aspheric coefficients are listed in Table 20 as follows:

TABLE 20

Aspheric coefficients of this preferred embodiment

| | Surface # | | | | |
|---|---|---|---|---|---|
| | 1 | 2 | 3 | 4 | 6 |
| k = | 5.19139E−01 | −2.00000E+01 | −1.15623E+00 | 5.92508E−01 | 1.06934E+01 |
| A4 = | 1.38497E−04 | 8.36856E−03 | −9.70115E−02 | −1.29740E−01 | −2.90364E−02 |
| A6 = | −1.32326E−03 | 3.20471E−03 | 5.68621E−02 | 5.53830E−02 | −4.84192E−02 |
| A8 = | 1.83723E−05 | −3.62902E−03 | −8.11693E−03 | 1.10545E−01 | 1.31327E−01 |
| A10 = | −8.30042E−05 | 1.60997E−03 | −1.53820E−03 | −1.95428E−01 | −2.58616E−01 |
| A12 = | −1.24466E−04 | −1.89712E−04 | 5.87386E−04 | 2.20379E−01 | 2.13078E−01 |

| | Surface # | | | | |
|---|---|---|---|---|---|
| | 7 | 8 | 9 | 10 | 11 |
| k = | −2.03061E+00 | 2.33948E+00 | 2.28085E+00 | 3.03263E−01 | 1.20419E+02 |
| A4 = | −8.22436E−02 | −6.91883E−02 | −4.32134E−02 | −2.50188E−02 | −5.07589E−02 |
| A6 = | −1.16345E−02 | −5.87707E−02 | −6.48762E−02 | 4.08868E−03 | 1.17212E−02 |
| A8 = | −1.33374E−03 | 4.77885E−02 | 7.26585E−02 | 1.52666E−02 | −2.10172E−03 |
| A10 = | −3.78817E−03 | −1.71711E−02 | −4.20878E−02 | −1.40881E−03 | 7.49859E−05 |
| A12 = | −9.94329E−04 | −1.01105E−02 | 1.18900E−02 | −9.00954E−04 | 2.19369E−05 |

TABLE 20-continued

| Aspheric coefficients of this preferred embodiment | | | | |
|---|---|---|---|---|
| A14 = | 5.99492E−03 | −1.22356E−03 | −1.93865E−04 | 2.22728E−06 |
| A16 = | | | 1.63689E−04 | −1.01072E−06 |

With reference to Table 19 and FIG. 7B for the optical lens assembly for image taking of this preferred embodiment, the focal length of the optical lens assembly for image taking is f=5.34 (mm), the overall aperture value (f-number) of the optical lens assembly for image taking is Fno=3.00, the half of maximum field view angle is HFOV=25.7°. After the optical data of this preferred embodiment are calculated and derived, the optical lens assembly satisfies related relations as shown in Table 21 below, and the related symbols have been described above and thus will not be described again.

TABLE 21

| Data of related relations of this preferred embodiment | | | |
|---|---|---|---|
| Relation | Data | Relation | Data |
| $v_1 - v_2$ | 30.3 | $f/f_1$ | 1.47 |
| $v_3 - v_4$ | 34.5 | $f/f_2$ | −1.46 |
| $T_{34}/T_{45}$ | 2.3 | $f/f_3$ | 1.57 |
| $R_1/R_2$ | −0.11 | $f/f_4$ | −0.04 |
| $R_9/f$ | −0.34 | BFL/TTL | 0.13 |
| $(R_3 - R_4)/(R_3 + R_4)$ | 0.49 | $S_d/T_d$ | 0.69 |
| $(R_5 + R_6)/(R_5 - R_6)$ | 1.15 | | |

According to the optical data as shown in Table 19 and the series of aberration curves as shown in FIG. 7B, the optical lens assembly for image taking in accordance with this preferred embodiment of the present invention provides good correction results in aspects of the longitudinal spherical aberration, astigmatic field curving, and distortion.

In the optical lens assembly for image taking of the present invention, the lens can be made of glass or plastic. If the lens is made of glass, the selection of the refractive power for the optical lens assembly can be more flexible. If the lens is made of plastic, the production cost can be reduced effectively. In addition, an aspherical surface can be formed on an optical surface of the lens, and the aspherical surface can be easily manufactured into shapes other than those within the limitation of a spherical surface to have more control factors for eliminating aberrations, so as to reduce the number of used lenses and the total length of the optical lens assembly for image taking of the present invention.

In the optical lens assembly for image taking of the present invention, if the lens surface is convex, the lens surface in paraxial region is convex; and if the lens surface is concave, the lens surface in paraxial region is concave.

In the optical lens assembly for image taking of the present invention, at least one aperture stop such as a glare stop or a field stop can be provided for reducing stray lights to improve the image quality.

Tables 1 to 21 show changes of values of an optical lens assembly for image taking in accordance with different preferred embodiments of the present invention respectively. However, the changes of values in the preferred embodiments of the present invention are obtained from experiments, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical lens assembly for image taking, sequentially arranged from an object side to an image side, comprising:
   a first lens element with positive refractive power, having a convex object-side surface;
   a second lens element with negative refractive power, having a convex object-side surface and a concave image-side surface;
   a third lens element with positive refractive power, having a convex image-side surface;
   a fourth lens element with refractive power, having both object-side surface and image-side surface being aspheric; and
   a fifth lens element with negative refractive power, having a concave object-side surface, and both object-side surface and image-side surface being aspheric;
   wherein f is a focal length of the optical lens assembly for image taking, $f_1$ is a focal length of the first lens element, $f_2$ is a focal length of the second lens element, $f_3$ is a focal length of the third lens element, $f_4$ is a focal length of the fourth lens element, $R_3$ is a curvature radius of the object-side surface of the second lens element, $R_4$ is a curvature radius of the image-side surface of the second lens element, $R_5$ is a curvature radius of the object-side surface of the third lens element, $R_6$ is a curvature radius of the image-side surface of the third lens element, and the following relations are satisfied:

$$0.7<f/f_1<2.5;$$

$$-2.5<f/f_2<-0.7;$$

$$0.8<f/f_3<2.5;$$

$$-0.7<f/f_4<0.5;$$

$$0.05<(R_3-R_4)/R_3+R_4)<0.8;$$

$$0.1<(R_5+R_6)/(R_5-R_6)<1.5.$$

2. The optical lens assembly for image taking of claim 1, further comprising a stop, wherein $T_d$ is an axial distance from the object-side surface of the first lens element to the image-side surface of the fifth lens element, $S_d$ is an axial distance from the stop to the image-side surface of the fifth lens element, and the following relation is satisfied:

$$0.5<S_d/T_d<0.8.$$

3. The optical lens assembly for image taking of claim 2, wherein $R_1$ is a curvature radius of the object-side surface of the first lens element, $R_2$ is a curvature radius of the image-side surface of the first lens element, and the following relation is satisfied:

$$-0.2<R_1/R_2<0.2.$$

4. The optical lens assembly for image taking of claim 2, wherein the fifth lens element has a convex image-side surface, $T_{34}$ is an axial distance between the third lens element and the fourth lens element, $T_{45}$ is an axial distance between the fourth lens element and the fifth lens element, and the following relation is satisfied:

$$0.3<T_{34}/T_{45}<1.3.$$

5. The optical lens assembly for image taking of claim 4, wherein f is the focal length of the optical lens assembly for image taking, $f_3$ is the focal length of the third lens element, and the following relation is further satisfied:

$$1.3<f/f_3<1.9.$$

6. The optical lens assembly for image taking of claim 4, wherein f is the focal length of the optical lens assembly for image taking, $R_9$ is a curvature radius of the object-side surface of the fifth lens element, and the following relation is satisfied:

$$-0.7<R_9/f<-0.3.$$

7. The optical lens assembly for image taking of claim 1, wherein $R_1$ is a curvature radius of the object-side surface of the first lens element, $R_2$ is a curvature radius of the image-side surface of the first lens element, and the following relation is satisfied $$-0.4<R_1/R_2<0.4.$$

8. The optical lens assembly for image taking of claim 7, wherein $v_1$ is an Abbe number of the first lens element, $v_2$ is an Abbe number of the second lens element, and the following relation is satisfied:

$$25<v_1-v_2<42.$$

9. The optical lens assembly for image taking of claim 8, wherein $R_3$ is the curvature radius of the object-side surface of the second lens element, $R_4$ is the curvature radius of the image-side surface of the second lens element, and the following relation is further satisfied:

$$0.2<(R_3-R_4)/(R_3+R_4)<0.5.$$

10. The optical lens assembly for image taking of claim 7, wherein the fourth lens element has a convex object-side surface and a concave image-side surface; the fifth lens element has a convex image-side surface; $v_3$ is an Abbe number of the third lens element, $v_4$ is an Abbe number of the fourth lens element, and the following relation is satisfied:

$$25<v_3-v_4<42.$$

11. The optical lens assembly for image taking of claim 7, wherein f is the focal length of the optical lens assembly for image taking, $f_4$ is a focal length of the fourth lens element, and the following relation is satisfied:

$$-0.4<f/f_4<0.2.$$

12. The optical lens assembly for image taking of claim 7, further comprising an image plane, wherein BFL is an axial distance from the image-side surface of the fifth lens element to the image plane, TTL is an axial distance from the object-side surface of the first lens element to the image plane, and the following relation is satisfied:

$$0.13<BFL/TTL<0.25.$$

13. An optical lens assembly for image taking, sequentially arranged from an object side to an image side, comprising:
  a first lens element with positive refractive power, having a convex object-side surface;
  a second lens element with negative refractive power, having a convex object-side surface and a concave image-side surface;
  a third lens element with refractive power, having a convex image-side surface;
  a fourth lens element with refractive power, having both object-side surface and image-side surface being aspheric; and
  a fifth lens element with refractive power, having a concave object-side surface and a convex image-side surface, and both object-side surface and image-side surface thereof being aspheric;
  wherein f is a focal length of the optical lens assembly for image taking, $f_1$ is a focal length of the first lens element, $f_4$ is a focal length of the fourth lens element, $R_5$ is a curvature radius of the object-side surface of the third lens element, $R_6$ is a curvature radius of the image-side surface of the third lens element, and the following relations are satisfied:

$$0.7<f/f_1<2.5;$$

$$-0.7<f/f_4<0.5;$$

$$0.1<(R_5+R_6)/(R_5-R_6)<1.5.$$

14. The optical lens assembly for image taking of claim 13, wherein $R_1$ is a curvature radius of the object-side surface of the first lens element, $R_2$ is a curvature radius of the image-side surface of the first lens element, and the following relation is satisfied:

$$-0.4<R_1/R_2<0.4.$$

15. The optical lens assembly for image taking of claim 14, wherein f is the focal length of the optical lens assembly for image taking, $R_9$ is a curvature radius of the object-side surface of the fifth lens element, and the following relation is satisfied:

$$-0.7<R_9/f<-0.3.$$

16. The optical lens assembly for image taking of claim 14, wherein the fifth lens element has negative refractive power.

17. The optical lens assembly for image taking of claim 16, further comprising a stop, wherein $T_d$ is an axial distance from the object-side surface of the first lens element to the image-side surface of the fifth lens element, $S_d$ is an axial distance from the stop to the image-side surface of the fifth lens element, and the following relation is satisfied:

$$0.5<S_d/T_d<0.8.$$

18. The optical lens assembly for image taking of claim 17, wherein $R_3$ is a curvature radius of the object-side surface of the second lens element, $R_4$ is a curvature radius of the image-side surface of the second lens element, and the following relation is satisfied:

$$<0.2<(R_3-R_4)/(R_3+R_4)<0.5.$$

19. The optical lens assembly for image taking of claim 17, wherein f is the focal length of the optical lens assembly for image taking, $f_3$ is a focal length of the third lens element, and the following relation is satisfied:

$$1.3<f/f_3<1.9.$$

20. The optical lens assembly for image taking of claim 16, wherein the third lens element has positive refractive power; the fourth lens element has a convex object-side surface and a concave image-side surface; f is the focal length of the optical lens assembly for image taking, $f_2$ is a focal length of the second lens element, and the following relation is satisfied:

$$-2.5<f/f_2<-0.7.$$

* * * * *

UNITED STATES PATENT AND TRADEMARK OFFICE
CERTIFICATE OF CORRECTION

PATENT NO. : 8,599,498 B2   Page 1 of 1
APPLICATION NO. : 13/231196
DATED : December 3, 2013
INVENTOR(S) : Hsin-Hsuan Huang It is certified that error appears in the above-identified patent and that said Letters Patent is hereby corrected as shown below:

In the Claims:

Col. 28, line 45, in claim 1, "$-0.7< f/f_4< 0.5$" should be "$-0.7 < f/f_4 < 0.5$"

Col. 29, line 24, in claim 7, "$-0.4 < R_1/R_2< 0.4$" should be "$-0.4 < R_1/R_2 < 0.4$"

Col. 30, line 51, in claim 18, "$< 0.2 < (R_3-R_4)/(R_3+R_4) < 0.5$" should be "$0.2 < (R_3-R_4)/(R_3+R_4) < 0.5$"

Signed and Sealed this
Eleventh Day of March, 2014

Michelle K. Lee
*Deputy Director of the United States Patent and Trademark Office*